United States Patent
Miyake

(10) Patent No.: US 10,236,492 B2
(45) Date of Patent: Mar. 19, 2019

(54) SECONDARY BATTERY

(71) Applicant: Semiconductor Energy Laboratory Co., LTD., Atsugi-shi, Kanagawa-ken (JP)

(72) Inventor: Hiroyuki Miyake, Kanagawa (JP)

(73) Assignee: Semiconductor Energy Laboratory Co., Ltd., Kanagawa-ken (JP)

( * ) Notice: Subject to any disclaimer, the term of this patent is extended or adjusted under 35 U.S.C. 154(b) by 95 days.

(21) Appl. No.: 15/013,546

(22) Filed: Feb. 2, 2016

(65) Prior Publication Data

US 2016/0226055 A1  Aug. 4, 2016

(30) Foreign Application Priority Data

Feb. 4, 2015 (JP) ................. 2015-020576

(51) Int. Cl.
| | | |
|---|---|---|
| *H01M 2/30* | (2006.01) | |
| *H01M 2/02* | (2006.01) | |
| *H01M 10/0525* | (2010.01) | |
| *H01M 2/06* | (2006.01) | |

(52) U.S. Cl.
CPC ........... *H01M 2/30* (2013.01); *H01M 2/0202* (2013.01); *H01M 2/06* (2013.01); *H01M 10/0525* (2013.01); *H01M 2220/30* (2013.01)

(58) Field of Classification Search
CPC combination set(s) only.
See application file for complete search history.

(56) References Cited

U.S. PATENT DOCUMENTS

| | | | |
|---|---|---|---|
| 4,745,529 A * | 5/1988 | Hamlen | H01M 2/10 362/157 |
| 6,599,659 B1 | 7/2003 | Endo et al. | |
| 6,664,005 B2 | 12/2003 | Kezuka et al. | |
| 7,270,912 B2 * | 9/2007 | Oogami | H01M 2/0207 429/159 |
| 8,192,863 B2 | 6/2012 | Best et al. | |
| 2012/0202101 A1 | 8/2012 | Ueda | |
| 2013/0045402 A1 * | 2/2013 | Takahashi | H01M 2/0212 429/90 |
| 2013/0108907 A1 | 5/2013 | Bhardwaj et al. | |

(Continued)

FOREIGN PATENT DOCUMENTS

| | | |
|---|---|---|
| JP | 58-197655 | 11/1983 |
| JP | 59-189554 | 10/1984 |

(Continued)

*Primary Examiner* — Kaity V Chandler
(74) *Attorney, Agent, or Firm* — Nixon Peabody LLP; Jeffrey L. Costellia

(57) ABSTRACT

A positive electrode and a negative electrode include stress relaxation regions each of which includes a tab and a lead of each electrode and may include a region divided by a slit provided for the electrode. In the case where the stress relaxation region includes a tab and a lead, the length of the stress relaxation region is 20% or more and 50% or less of the sum of the lengths of the lead and the electrode not overlapping with the lead in an inner region of a secondary battery. In the case where the stress relaxation region further includes a region divided by the slit, the length of the stress relaxation region is 20% or more and 95% or less of the sum of the lengths of the lead and the electrode not overlapping with the lead in an inner region of a secondary battery.

16 Claims, 28 Drawing Sheets

(56) References Cited

U.S. PATENT DOCUMENTS

| | | |
|---|---|---|
| 2013/0177798 A1 | 7/2013 | Ueda |
| 2015/0111088 A1 | 4/2015 | Hiroki et al. |
| 2015/0147626 A1 | 5/2015 | Tajima et al. |
| 2015/0162590 A1 | 6/2015 | Takahashi et al. |
| 2015/0243962 A1* | 8/2015 | Hiroki .................... H01M 4/02 429/233 |
| 2015/0333360 A1 | 11/2015 | Tajima et al. |
| 2015/0340664 A1 | 11/2015 | Takahashi et al. |
| 2016/0118640 A1 | 4/2016 | Miyake |
| 2016/0156012 A1 | 6/2016 | Takahashi et al. |
| 2016/0156071 A1 | 6/2016 | Yamakaji et al. |
| 2016/0218387 A1 | 7/2016 | Tajima et al. |

FOREIGN PATENT DOCUMENTS

| | | |
|---|---|---|
| JP | 07-006771 | 1/1995 |
| JP | 2001-093581 | 4/2001 |
| JP | 2001-266894 | 9/2001 |
| JP | 2002-063938 | 2/2002 |
| JP | 2004-087300 | 3/2004 |
| JP | 2005-332591 | 12/2005 |
| JP | 2005-347158 | 12/2005 |
| JP | 2006-331874 | 12/2006 |
| JP | 2007-066619 | 3/2007 |
| JP | 2007-234466 | 9/2007 |
| JP | 2009-533831 | 9/2009 |
| JP | 2010-165495 | 7/2010 |
| JP | 2013-048041 | 3/2013 |
| JP | 2013-048042 | 3/2013 |
| WO | WO-2007/118281 | 10/2007 |
| WO | WO-2012/001885 | 1/2012 |
| WO | WO-2012/140707 | 10/2012 |

* cited by examiner

SECONDARY BATTERY

BACKGROUND OF THE INVENTION

1. Field of the Invention

The present invention relates to an object, a method, or a manufacturing method. In addition, the present invention relates to a process, a machine, manufacture, or a composition of matter. In particular, one embodiment of the present invention relates to a semiconductor device, a display device, a light-emitting device, a power storage device, an imaging device, a driving method thereof, or a manufacturing method thereof. In particular, one embodiment of the present invention relates to a secondary battery and a method for manufacturing the secondary battery.

2. Description of the Related Art

In recent years, wearable devices have been actively developed. Since wearable devices are worn on one's body, it is preferable that they have a shape along a curved surface of the body. Therefore, secondary batteries used in wearable devices are needed to be curved in the shape along a curved surface of the body and to have flexibility like displays and other housings.

For example, Patent Document 1 discloses a secondary battery which has a curved shape, and electronic devices including the secondary battery.

Important things in an improvement in reliability of a secondary battery are a positive electrode tab and a negative electrode tab, for example. Note that a positive electrode tab refers to a portion in a positive electrode; the portion extends to be electrically connected to a positive electrode lead and includes a region where an active material is not formed. A negative electrode tab refers to a portion in a negative electrode; the portion extends to be electrically connected to a negative electrode lead and includes a region where an active material is not formed. These portions mostly have elongated shapes and are likely to cause a crack, a breakage, or the like compared with a portion where an active material is formed.

For example, Patent Document 2 discloses a secondary battery where slits or the like are provided in tab portions to reduce metal fatigue of a positive electrode tab and a negative electrode tab.

REFERENCE

Patent Documents

[Patent Document 1] United States Patent Application Publication No. 2013/0108907
[Patent Document 2] Japanese Published Patent Application No. 2005-347158

SUMMARY OF THE INVENTION

In the case of using a secondary battery having a curved shape or flexibility, stress applied to a positive electrode tab and a negative electrode tab is further increased compared with the case of using the secondary battery described in Patent Document 2. Thus, a structure with which stress applied to the positive electrode tab and the negative electrode tab can be relaxed when the secondary battery is curved.

Thus, in one embodiment of the present invention, a secondary battery having a novel structure is provided. Specifically, a curved or a flexible secondary battery having a novel structure is provided.

An object of one embodiment of the present invention is to provide a novel power storage device, an electronic device including a novel secondary battery, or the like. Note that the descriptions of these objects do not disturb the existence of other objects. In one embodiment of the present invention, there is no need to achieve all the objects. Other objects will be apparent from and can be derived from the description of the specification, the drawings, the claims, and the like.

To achieve the above object, in one embodiment of the present invention, a positive electrode and a negative electrode (hereinafter a positive electrode and a negative electrode are collectively referred to as an electrode) include stress relaxation regions. The stress relaxation region includes a tab and a lead of each electrode. The stress relaxation region includes, in addition to the tab and the lead, a region divided by a slit provided for the electrode in some cases. In the case where the stress relaxation region includes a tab and a lead, the length of the stress relaxation region is 20% or more and 50% or less, preferably 30% or more and 50% or less of the sum of the lengths of the lead and the electrode not overlapping with the lead in an inner region of a secondary battery. In the case where the stress relaxation region includes, in addition to a tab and a lead, a region divided by a slit provided for the electrode, the length of the stress relaxation region is 20% or more and 95% or less, preferably 30% or more and 95% or less of the sum of the lengths of the lead and the electrode not overlapping with the lead in an inner region of a secondary battery.

One embodiment of the present invention is a secondary battery including an electrode, a lead electrically connected to the electrode, and an exterior body by which the electrode and the lead are sandwiched. The secondary battery includes an inner region. The electrode includes a stress relaxation region. The length $L_{pt}$ of the stress relaxation region of the electrode is 30% or more of the length $L_{p1}$ in the inner region.

Another embodiment of the present invention is a secondary battery including an electrode, a lead electrically connected to the electrode, and an exterior body by which the electrode and the lead are sandwiched. The exterior body includes a sealing region. The secondary battery includes an inner region located inward from the sealing region. The electrode includes a stress relaxation region. The length $L_{pt}$ of the stress relaxation region of the electrode is 30% or more of the length $L_{p1}$ in the inner region.

Another embodiment of the present invention is a secondary battery including a positive electrode, a positive electrode lead electrically connected to the positive electrode, a negative electrode, a negative electrode lead electrically connected to the negative electrode, and an exterior body by which the positive electrode, the positive electrode lead, the negative electrode, and the negative electrode lead are sandwiched. The exterior body includes a sealing region. The secondary battery includes an inner region located inward from the sealing region. The positive electrode includes a positive electrode tab. The length $L_{pt}$ in the inner region is 30% or more and 50% or less of the length $L_{p1}$ in the inner region. The negative electrode includes a negative electrode tab. The length $L_{pt}$ in the inner region is 30% or more and 50% or less of the length $L_{n1}$ in the inner region.

Another embodiment of the present invention is a secondary battery including a positive electrode, a positive electrode lead electrically connected to the positive electrode, a negative electrode, a negative electrode lead electrically connected to the negative electrode, and an exterior body by which the positive electrode, the positive electrode lead, the negative electrode, and the negative electrode lead are sandwiched. The exterior body includes a sealing region. The secondary battery includes an inner region located inward from the sealing region. The positive electrode includes a positive electrode tab and a slit parallel to a direction in which the positive electrode tab extends. The length $L_{p2}$ in the inner region is 30% or more and 95% or less of the length $L_{p1}$ in the inner region. The negative electrode includes a negative electrode tab and a slit parallel to a direction in which the negative electrode tab extends. The length $L_{n2}$ in the inner region is 30% or more and 95% or less of the length $L_{n1}$ in the inner region.

Furthermore, in the above structure, the exterior body preferably has unevenness.

According to one embodiment of the present invention, a secondary battery having a novel structure can be provided. Specifically, a curved or flexible secondary battery having a novel structure can be provided. More specifically, a secondary battery having a structure with which stress applied to a positive electrode tab and a negative electrode tab can be relaxed when the secondary battery is curved can be provided. Note that the description of these effects does not disturb the existence of other effects. One embodiment of the present invention does not necessarily achieve all the effects listed above. Other effects will be apparent from and can be derived from the description of the specification, the drawings, the claims, and the like.

BRIEF DESCRIPTION OF THE DRAWINGS

In the accompanying drawings:

FIGS. 14A, 14B1, 14B2, and 14C are a top view and cross-sectional views illustrating a structure example of a secondary battery;

FIGS. 18A, 18B1, and 18B2 are perspective views illustrating examples of electronic devices;

FIGS. 21A and 21B are cross-sectional views illustrating a conventional example of a conductive additive and the like;

DETAILED DESCRIPTION OF THE INVENTION

Figure 1A:
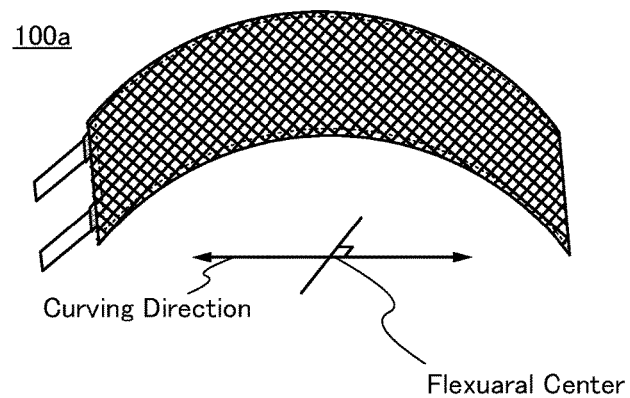
FIGS. 1A to 1C are a perspective view, a top view, and a cross-sectional view of a secondary battery of one embodiment of the present invention.

Embodiments of the present invention will be described below in detail with reference to the drawings. However, the present invention is not limited to the description below, and it is easily understood by those skilled in the art that modes and details disclosed herein can be modified in various ways. Furthermore, the present invention is not construed as being limited to description of the embodiments.

The term "electrically connected" includes the case where components are connected through an "object having any electric function". There is no particular limitation on the "object having any electric function" as long as electric signals can be transmitted and received between the components connected through the object.

The position, size, range, or the like of each component illustrated in drawings and the like is not accurately represented in some cases for easy understanding. Therefore, the disclosed invention is not necessarily limited to the position, size, range, or the like disclosed in the drawings and the like.

The ordinal number such as "first", "second", and "third" are used to avoid confusion among components.

Embodiment 1

In this embodiment, structure examples of a secondary battery of one embodiment of the present invention are described with reference to FIGS. 1A to 1C, FIGS. 2A and 2B, FIGS. 3A to 3C, and FIGS. 4A and 4B.

[1. Structure 1]

Figure 1B:
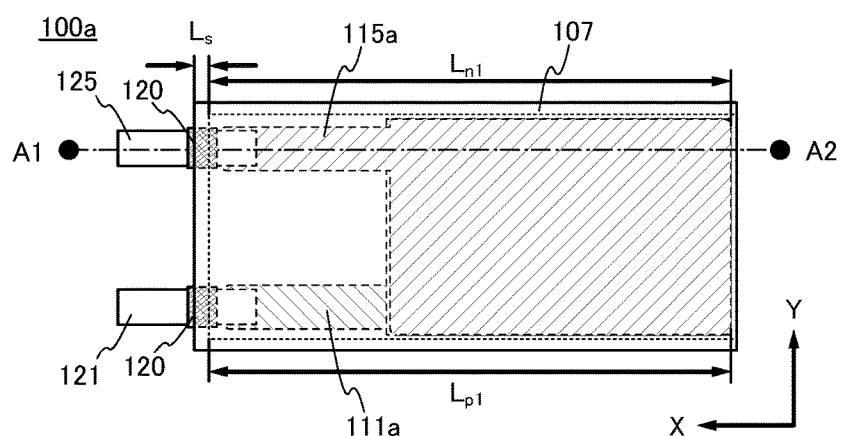
Figure 1C:
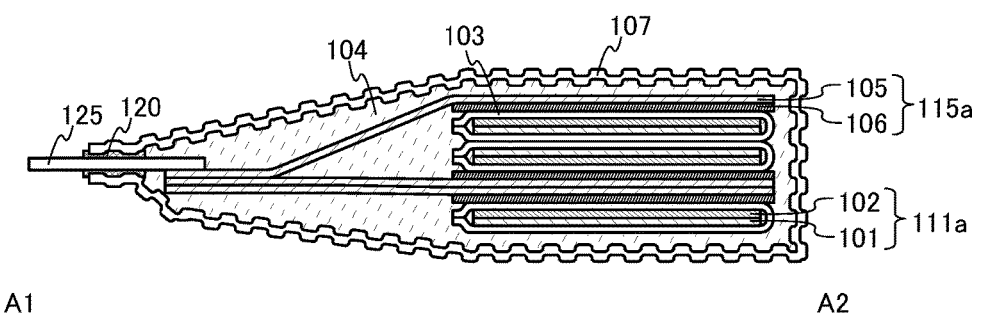
Figure 2A:
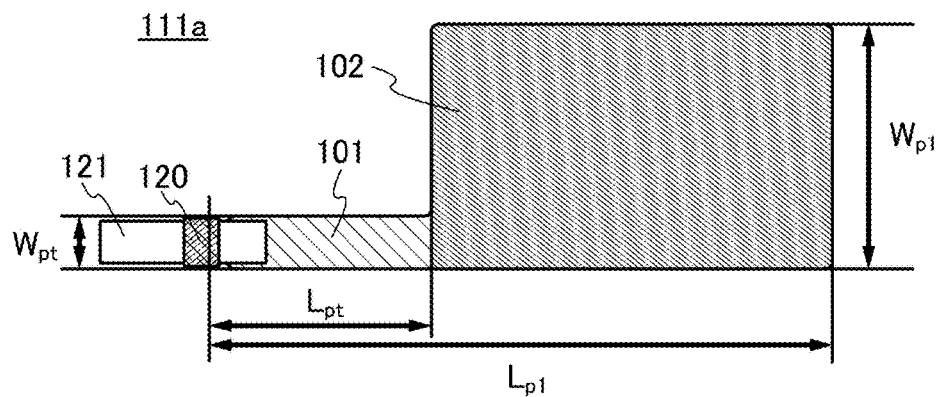
FIGS. 2A and 2B are top views of a positive electrode and a negative electrode included in a secondary battery of one embodiment of the present invention.
Figure 2B:
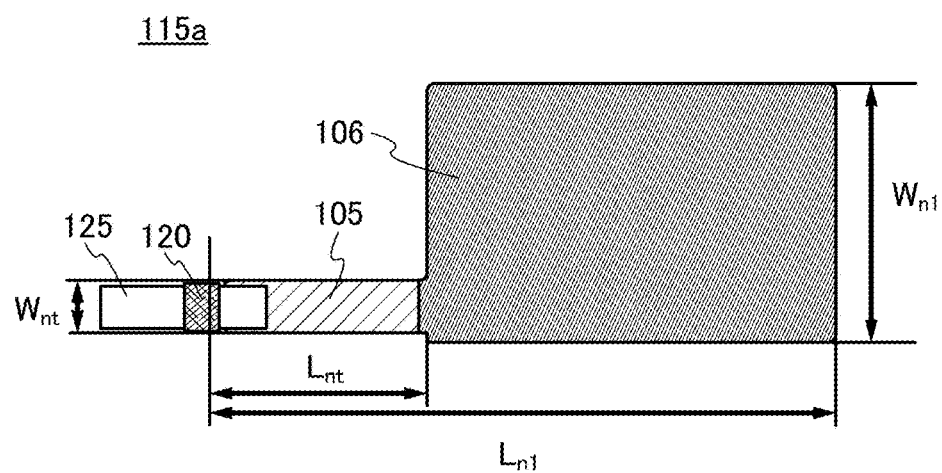

A structure example of a secondary battery 100a is shown in FIGS. 1A to 1C and FIGS. 2A and 2B. FIG. 1A is a perspective view of the secondary battery 100a. FIG. 1B is a top view of the secondary battery 100a. FIG. 1C is a cross-sectional view taken along dashed-dotted line A1-A2 in FIG. 1B. FIG. 2A is a top view of a positive electrode 111a included in the secondary battery 100a on the positive electrode active material layer 102 side. FIG. 2B is a top view of a negative electrode 115*a* included in the secondary battery 100*a* on the negative electrode active material layer 106 side.

As illustrated in FIG. 1A, the secondary battery 100*a* can be curved in at least one axis direction or has flexibility. In this specification and the like, the expression "an object is curved" can also be referred to as "an object is bent", "an object has a concave surface", "an object has a convex surface", "an object is warped", "an object is changed in shape", and the like.

The secondary battery 100*a* includes the plurality of positive electrodes 111*a*, a positive electrode lead 121 electrically connected to the plurality of positive electrodes 111*a*, the plurality of negative electrodes 115*a*, and a negative electrode lead 125 electrically connected to the plurality of negative electrodes 115*a*. The positive electrodes 111*a* are each covered with a separator 103. In addition, the secondary battery 100*a* includes an exterior body 107 by which the positive electrode 111*a*, the positive electrode lead 121, the negative electrode 115*a*, and the negative electrode lead 125 are sandwiched.

The exterior body 107 includes a sealing region. Note that in this specification and the like, a sealing region refers to a region which is provided at an end portion of the secondary battery 100*a* and which has a function of bonding the exterior body 107 over the positive electrode 111*a*, the negative electrode 115*a*, and the like to the exterior body 107 under the positive electrode 111*a*, the negative electrode 115*a*, and the like.

Furthermore, the secondary battery 100*a* includes an inner region which is located inward from the sealing region of the exterior body 107. In the inner region of the secondary battery 100*a*, the positive electrode 111*a*, part of the positive electrode lead 121, the negative electrode 115*a*, part of the negative electrode lead 125, and an electrolyte solution 104 are provided. In other words, the inner region of the secondary battery 100*a* is a region which does not overlap with the sealing region and where a change in shape, displacement, and the like of electrodes and leads are caused when the secondary battery 100*a* is curved. Note that in the case where a film is bent at an end portion of the exterior body 107, for example, a sealing region is not provided at the end portion of the exterior body in some cases. In this case, the inside of the exterior body is referred to as an inner region.

The positive electrode lead 121 and the negative electrode lead 125 each include a sealing layer 120.

As shown in FIG. 1B, the length of the sealing region is referred to as $L_s$. In addition, the sum of the lengths of the positive electrode lead 121 and the positive electrode 111*a* not overlapping with the positive electrode lead 121 in the inner region is referred to as $L_{p1}$. Note that the length of the positive electrode 111*a* includes the length of the positive electrode tab. The sum of the lengths of the negative electrode lead 125 and the negative electrode 115*a* not overlapping with the negative electrode lead 125 in the inner region is referred to as $L_{n1}$. Note that the length of the negative electrode 115*a* includes the length of the negative electrode tab. In this specification and the like, a length refers to the X axis direction in FIG. 1B, that is, a direction in which a stress relaxation region, which is described later, extends. In addition, the Y axis direction in FIG. 1B is referred to as a width.

As shown in FIG. 2A, the sum of the lengths of the positive electrode lead 121 and a tab of the positive electrode 111*a* not overlapping with the positive electrode lead 121 in the inner region is referred to as $L_{pt}$. In addition, the width of the tab of the positive electrode 111*a* and the maximum width of the positive electrode 111*a* are referred to as $W_{pt}$ and $W_{p1}$, respectively.

Similarly, as shown in FIG. 2B, the sum of the lengths of the negative electrode lead 125 and a tab of the negative electrode 115*a* not overlapping with the negative electrode lead 125 in the inner region is referred to as $L_{nt}$. In addition, the width of the tab of the negative electrode 115*a* and the maximum width of the negative electrode 115*a* are referred to as $W_{nt}$ and $W_{n1}$, respectively. Note that in this specification and the like, a tab refers to a portion which is in an electrode and is narrower than the maximum width. In a part of the tab, the electrode is electrically connected to the lead. Specifically, the tab of the positive electrode 111*a* and the positive electrode lead 121 overlap and are in close contact with each other to be electrically connected to each other.

The positive electrode lead 121 and the negative electrode lead 125 of the secondary battery 100*a* are fixed in the sealing region of the exterior body 107. When the secondary battery 100*a* is curved, stress due to curving is concentrated on weak portions in the electrode, that is, the tab of the positive electrode 111*a*, the positive electrode lead 121, the tab of the negative electrode 115*a*, and the negative electrode lead 125, which are portions whose widths are narrow.

From the calculation results, the present inventor has found that if the lead or the tab in the inner region of the secondary battery 100*a* is long, stress due to curving can be relaxed. Specifically, the sum $L_{pt}$ of the lengths of the positive electrode lead 121 and the tab of the positive electrode 111*a* not overlapping with the positive electrode lead 121 in the inner region is preferably 20% or more, further preferably 30% or more of the sum $L_{p1}$ of the lengths of the positive electrode lead 121 and the positive electrode 111*a* not overlapping with the positive electrode lead 121 in the inner region because stress due to curving can be significantly relaxed.

Similarly, the sum $L_{nt}$ of the lengths of the negative electrode lead 125 and the tab of the negative electrode 115*a* not overlapping with the negative electrode lead 125 in the inner region is preferably 20% or more, further preferably 30% or more of the sum $L_{n1}$ of the lengths of the negative electrode lead 125 and the negative electrode 115*a* not overlapping with the negative electrode lead 125 in the inner region because stress due to curving can be significantly relaxed.

However, when the lead and the tab in the inner region are too long, the capacity of the secondary battery 100*a* is reduced; thus, $L_{pt}$ is preferably 50% or less of $L_{p1}$. Similarly, $L_{nt}$ is preferably 50% or less of $L_{n1}$.

From the above effect, the tab of the positive electrode 111*a* and the positive electrode lead 121 in the inner region are collectively referred to as a stress relaxation region of the positive electrode in some cases. Similarly, the tab of the negative electrode 115*a* and the negative electrode lead 125 in the inner region are collectively referred to as a stress relaxation region of the negative electrode in some cases.

Although the positive electrode 111*a* and the negative electrode 115*a* each include a stress relaxation region in FIGS. 1A to 1C and FIGS. 2A and 2B, one embodiment of the present invention is not limited to the structure. Either the positive electrode 111*a* or the negative electrode 115*a* includes a stress relaxation region in some cases.

Note that the secondary battery 100*a* includes three positive electrodes 111*a* in each of which the positive electrode active material layer 102 is formed on one surface of a positive electrode current collector 101 and three negative electrodes 115*a* in each of which the negative electrode active material layer 106 is formed on one surface of a negative electrode current collector 105. These electrodes are positioned so that the positive electrode active material layer 102 and the negative electrode active material layer 106 face each other with the separator 103 provided therebetween. Furthermore, the negative electrodes 115a are positioned so that the surfaces thereof which are not provided with the negative electrode active material layers 106 are in contact with each other.

When the electrodes are positioned as described above, a contact surface between metals such as a contact surface between the surfaces of the negative electrodes 115a which are not provided with the negative electrode active material layers 106 can be formed. The contact surface between metals has a lower coefficient of friction than a contact surface between the active material layer and the separator 103.

Thus, when the positive electrodes 111a and the negative electrodes 115a are curved, the surfaces of the negative electrodes 115a which are not provided with the negative electrode active material layers 106 slide, so that stress caused by the difference between the inner diameter and the outer diameter of a curved portion can be reduced. Accordingly, the positive electrode 111a and the negative electrode 115a can be prevented from deteriorating. In addition, the secondary battery 100a can be highly reliable.

Note that the secondary battery 100a may include one or two positive electrodes 111a and one or two negative electrodes 115a. The secondary battery 100a can be thinner and easily curved by reducing the number of stacks. Alternatively, four or more positive electrodes 111a and four or more negative electrodes 115a may be stacked. The capacity of the secondary battery 100a can be increased by increasing the number of the stacks.

Although the separator 103 covers the positive electrode 111a in the secondary battery 100a, one embodiment of the present invention is not limited thereto. The separator 103 may cover the negative electrode 115a. The separator 103 can be provided anywhere between the positive electrode active material layer 102 and the negative electrode active material layers 106; thus, the separator 103 does not cover the positive electrode 111a or the negative electrode 115a in some cases.

Moreover, as illustrated in FIGS. 1A and 1C, the exterior body 107 preferably has unevenness. With the exterior body 107 having unevenness, stress applied to the exterior body 107 when the shape of the secondary battery 100a is changed can be relaxed. Therefore, the secondary battery 100a can be highly reliable. For simplification, unevenness of the exterior body 107 is not illustrated in FIG. 1B.

[2. Structure 2]

Although the tab and the lead are collectively referred to as the stress relaxation region in FIGS. 1A to 1C and FIGS. 2A and 2B, one embodiment of the present invention is not limited thereto. The tab, the lead, and a region divided by a slit provided for an electrode are collectively referred to as a stress relaxation region in some cases.

Figure 3A:
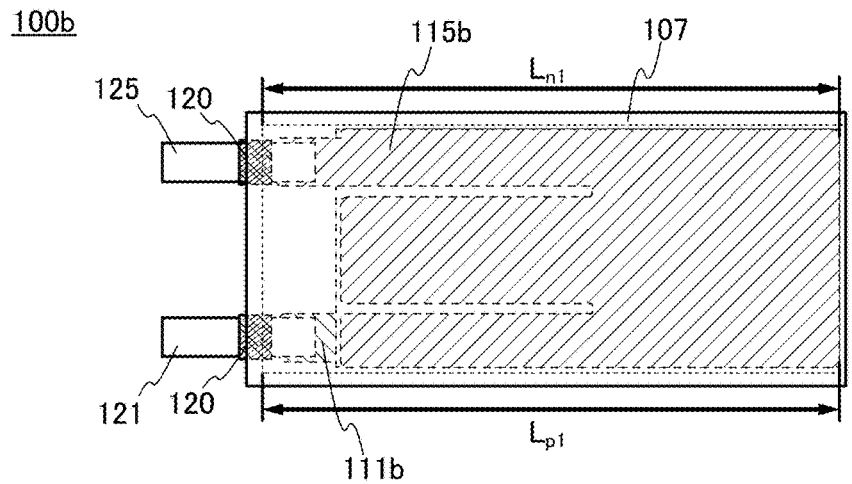
FIG. 3A is a top view of a secondary battery of one embodiment of the present invention and FIGS. 3B and 3C are each a top view of a positive electrode included in the secondary battery.
Figure 3B:
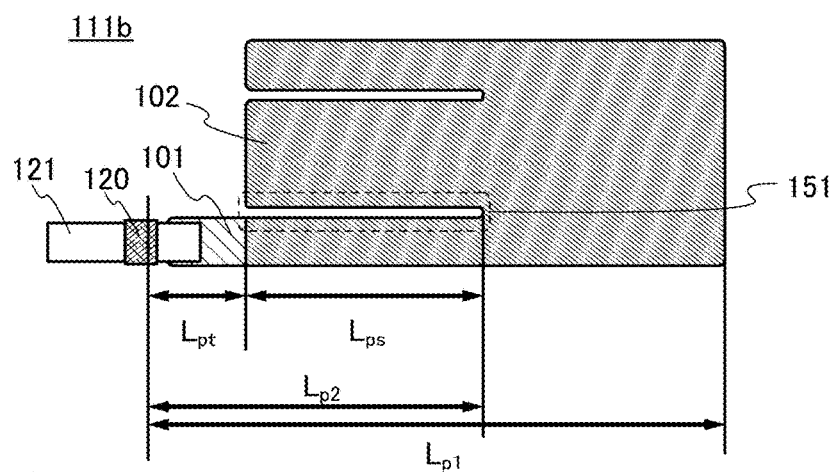
Figure 3C:
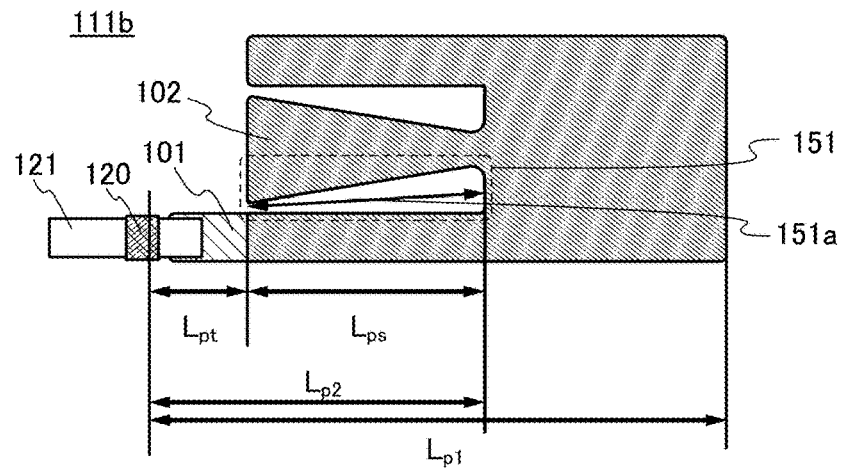
Figure 4A:
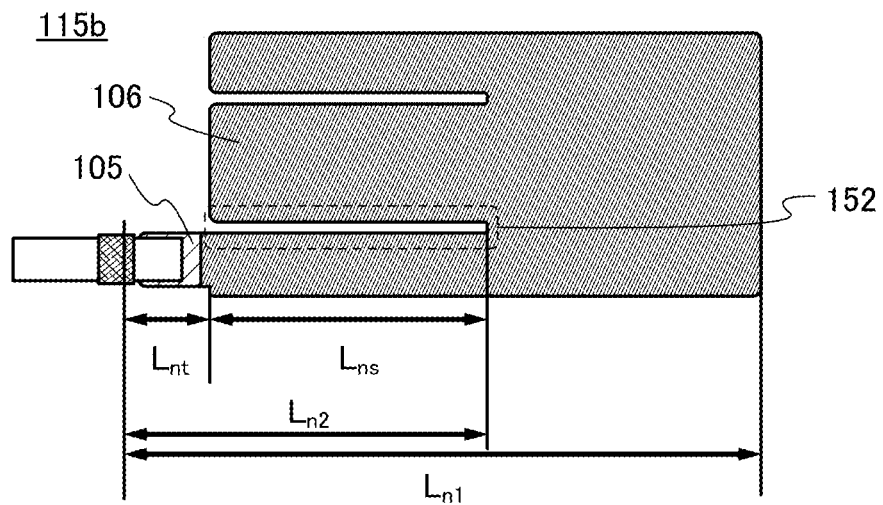
FIGS. 4A and 4B are each a top view of a negative electrode included in a secondary battery of one embodiment of the present invention.
Figure 4B:
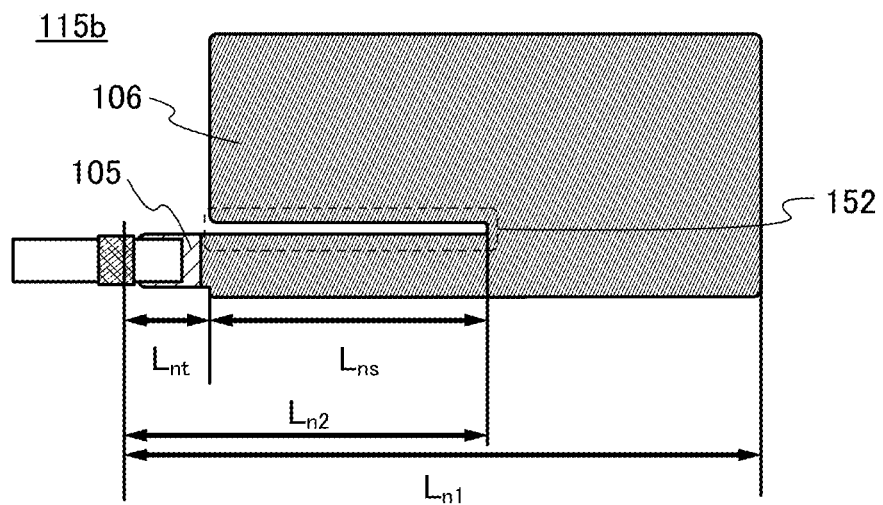

Structure examples of a secondary battery 100b are shown in FIGS. 3A to 3C and FIGS. 4A and 4B. FIG. 3A is a top view of the secondary battery 100b. FIG. 3B is a top view of a positive electrode 111b on the positive electrode active material layer 102 side in the secondary battery 100b. FIG. 3C shows another example of the shape of the positive electrode 111b that can be used in the secondary battery 100b. FIG. 4A is a top view of a negative electrode 115b on the negative electrode active material layer 106 side in the secondary battery 100b. FIG. 4B shows another example of the shape of the negative electrode 115b that can be used in the secondary battery 100b.

The secondary battery 100b can be curved in at least one axis direction or has flexibility like the secondary battery 100a in FIG. 1A.

As illustrated in FIGS. 3B and 3C, the positive electrode 111b of the secondary battery 100b has a slit 151. The longitudinal direction of the slit 151 is preferably parallel to the direction in which the tab extends (the longitudinal direction of the tab). In addition, as illustrated in FIGS. 4A and 4B, the negative electrode 115b of the secondary battery 100b has a slit 152. The longitudinal direction of the slit 152 is preferably parallel to a direction in which the tab extends.

Note that in this specification and the like, "parallel" also means a state in which objects are parallel to each other with a slight deviation, and includes a state where objects are parallel to each other within an error of approximately ±30°. The slit is not limited to a linear shape, and the slit may have different widths depending on regions like the slit 151 in FIG. 3C or may have a curve. In the case where the slit has different widths depending on regions or has a curve, a line that connects the centers of end portions of the slit in the length direction of the electrode is referred to as a slit direction. For example, the direction of the slit 151 in FIG. 3C is a direction represented by a straight line 151a.

As shown in FIG. 3A, the sum of the lengths of the positive electrode lead 121 and the positive electrode 111b not overlapping with the positive electrode lead 121 in the inner region is referred to as $L_{p1}$. In addition, the sum of the lengths of the negative electrode lead 125 and the negative electrode 115b not overlapping with the negative electrode lead 125 in the inner region is referred to as $L_{n1}$.

As shown in FIGS. 3B and 3C, the sum of the lengths of the positive electrode lead 121 and a tab of the positive electrode 111b not overlapping with the positive electrode lead 121 in the inner region is referred to as $L_{pt}$. The length of the slit provided for the positive electrode 111b is referred to as $L_{ps}$. In addition, the sum of $L_{pt}$ and $L_{ps}$ is referred to as $L_{p2}$.

Similarly, as shown in FIGS. 4A and 4B, the sum of the lengths of the negative electrode lead 125 and a tab of the negative electrode 115b not overlapping with the negative electrode lead 125 in the inner region is referred to as $L_{nt}$. The length of the slit provided for the negative electrode 115b is referred to as $L_{ns}$. In addition, the sum of $L_{nt}$ and $L_{ns}$ is referred to as $L_{n2}$.

The sum $L_{p2}$ of the lengths of the positive electrode lead 121, the tab of the positive electrode 111b not overlapping with the positive electrode lead 121, and the slit in the inner region is preferably 20% or more, further preferably 30% or more of the sum $L_{p1}$ of the lengths of the positive electrode lead 121 and the positive electrode 111b not overlapping with the positive electrode lead 121 in the inner region because stress due to curving can be relaxed.

Similarly, the sum $L_{n2}$ of the lengths of the negative electrode lead 125, the tab of the negative electrode 115b not overlapping with the positive electrode lead 125, and the slit in the inner region is preferably 20% or more, further preferably 30% or more of the sum $L_{n1}$ of the lengths of the negative electrode lead 125 and the negative electrode 115b not overlapping with the negative electrode lead 125 in the inner region because stress due to curving can be relaxed.

In a structure where a tab, a lead, and a region divided by a slit provided for an electrode are collectively referred to as a stress relaxation region, even if the tab is short, the slit is lengthened, whereby the stress relaxation region can be long. As a result, stress due to curving can be relaxed without reducing the capacity of the secondary battery 100b.

Thus, $L_{p2}$ is more than 50% of $L_{p1}$ and preferably less than or equal to 95% of $L_{p1}$ to keep the strength of the positive electrode. Similarly, $L_{n2}$ is more than 50% of $L_{n1}$ and preferably less than or equal to 95% of $L_{n1}$ to keep the strength of the negative electrode.

The description of the secondary battery 100a can be referred to for the secondary battery 100b except for the shapes of the positive electrode and the negative electrode.

In this embodiment, the positive electrode 111a is electrically connected to the positive electrode lead 121 and the negative electrode 115a is electrically connected to the negative electrode lead 125 in the inner region of the exterior body 107; however, one embodiment of the present invention is not limited thereto. The positive electrode 111a may be electrically connected to the positive electrode lead 121 outside the sealing region. In that case, the stress relaxation region does not include the positive electrode lead 121 in some cases. Similarly, the negative electrode 115a may be electrically connected to the negative electrode lead 125 outside the sealing region. In that case, the stress relaxation region does not include the negative electrode lead 125 in some cases.

In Embodiment 1, one embodiment of the present invention has been described. Other embodiments of the present invention are described in Embodiments 2 to 6. Note that one embodiment of the present invention is not limited to the examples. Although the examples in which one embodiment of the present invention is applied to the curved power storage device, the flexible power storage device, or the power storage device that can be changed in shape are shown, one embodiment of the present invention is not limited thereto. In addition, for example, depending on circumstances or conditions, one embodiment of the present invention can be used in a power storage device that cannot be changed in shape. The example in which one embodiment of the present invention is used in a secondary battery is described; however, one embodiment of the present invention is not limited thereto. Depending on circumstances or conditions, one embodiment of the present invention can be used in a variety of secondary batteries, a lithium-ion secondary battery, a lead storage battery, a lithium-ion polymer secondary battery, a nickel-hydrogen storage battery, a nickel-cadmium storage battery, a nickel-iron storage battery, a nickel-zinc storage battery, a silver oxide-zinc storage battery, a solid-state battery, an air battery, a zinc air battery, a lithium air battery, a primary battery, a capacitor, an electric double layer capacitor, an ultracapacitor, a supercapacitor, a lithium ion capacitor, and the like.

This embodiment can be implemented in appropriate combination with any of the other embodiments.

Embodiment 2

In this embodiment, an example of a manufacturing method of the secondary battery in one embodiment of the present invention, specifically, the secondary battery 100a, is described with reference to FIGS. 5A to 5C, FIGS. 6A to 6C, FIGS. 7A to 7C, and FIGS. 8A and 8B.

[1. Preparing Positive Electrode and Covering it with Separator]

First, the positive electrode active material layer 102 is formed over the positive electrode current collector 101, and they are processed into a shape of the positive electrode 111a. Then, the positive electrode 111a is sandwiched by the folded separator 103 (FIG. 5A).

Figure 5A:
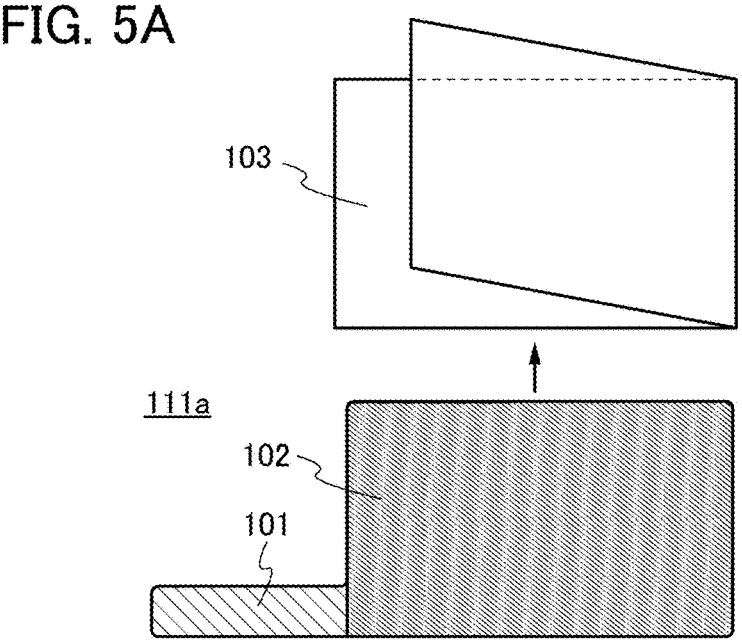
FIGS. 5A to 5C are top views illustrating a method for manufacturing a secondary battery of one embodiment of the present invention.
Figure 5B:
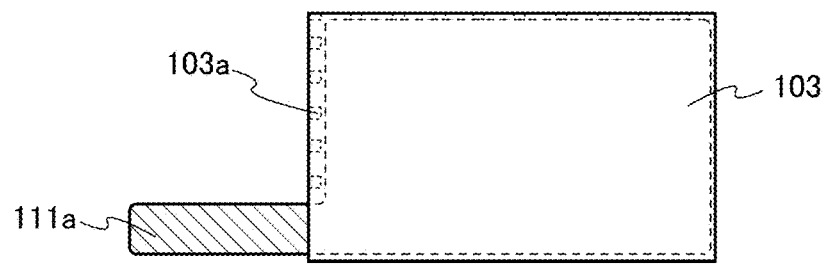

Then, the outer edges of the separator 103 outside the positive electrode 111a are bonded to form the bag-like separator 103 (FIG. 5B). The bonding of the outer edges of the separator 103 can be performed with the use of an adhesive or the like, by ultrasonic welding, or by thermal fusion bonding.

In this embodiment, polypropylene is used as the separator 103, and the outer edges of the separator 103 are bonded by heating. The bonding portion is shown as a region 103a in FIG. 5B. In this manner, the positive electrode 111a can be covered with the separator 103. The separator 103 is formed so as to cover the positive electrode active material layer 102 and does not necessarily cover the whole positive electrode 111a.

Note that although the separator 103 is folded in FIG. 5A, one embodiment of the present invention is not limited thereto. For example, the positive electrode 111a may be sandwiched between two separators. In that case, the region 103a may be formed to surround almost all of four sides of the separators.

The outer edges of the separator 103 may be bonded so as to fix a long and narrow region along the outer edges or may be intermittently bonded using dot-like bonding portions provided at regular intervals as in FIG. 5B.

Alternatively, bonding may be performed on only one side of the outer edges. Alternatively, bonding may be performed on only two sides of the outer edges. Alternatively, bonding may be performed on four sides of the outer edges, in which case the four sides can be in an even state.

[2. Preparing Negative Electrode]

Figure 5C:
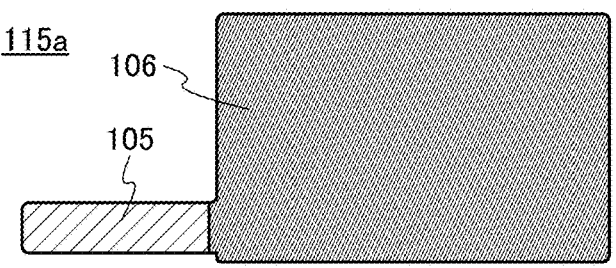

Next, the negative electrode active material layer 106 is formed over the negative electrode current collector 105, and they are processed into a shape of the negative electrode 115a (FIG. 5C).

[3. Stacking Positive Electrode and Negative Electrode]

Figure 6A:
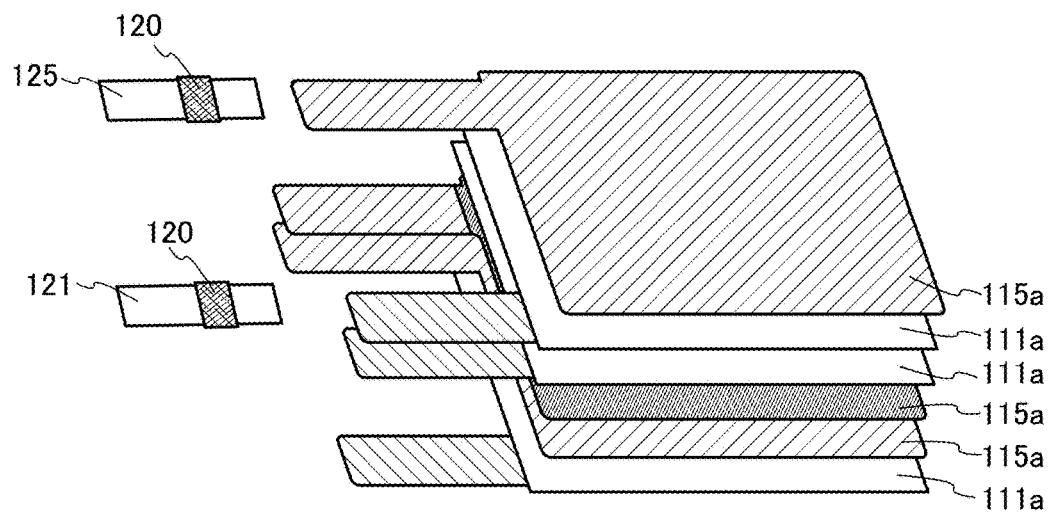
FIGS. 6A to 6C are perspective views and a top view illustrating a method for manufacturing a secondary battery of one embodiment of the present invention.

Next, the positive electrodes 111a and the negative electrodes 115a are stacked (FIG. 6A). In this embodiment, three positive electrodes 111a each having the positive electrode active material layer 102 on one surface and three negative electrodes 115a each having the negative electrode active material layer 106 on one surface are stacked. The positive electrodes 111 and the negative electrodes 115 are positioned so that the positive electrode active material layer 102 and the negative electrode active material layer 106 face each other with the separator 103 provided therebetween. Furthermore, the negative electrodes 115a are positioned so that the surfaces which are not provided with the negative electrode active material layers 106 are in contact with each other.

[4. Connecting Positive Electrode Lead and Negative Electrode Lead]

Next, the positive electrode lead 121 including the sealing layer 120 is electrically connected to positive electrode tabs of the plurality of positive electrode current collectors 101 by ultrasonic wave irradiation while pressure is applied (ultrasonic welding).

A lead electrode is likely to be cracked or cut by stress due to external force applied after fabrication of the secondary battery. Here, when subjected to ultrasonic welding, the positive electrode lead 121 and the positive electrode tab may be placed between bonding dies provided with projections, whereby a connection region and a curved portion can be preferably formed in the positive electrode tab. This curved portion can relax stress due to external force applied after fabrication of the secondary battery 100a. Accordingly, the reliability of the secondary battery 100a can be increased.

The curved portion is not necessarily formed in the positive electrode tab. The positive electrode current collector may be formed using a high-strength material such as stainless steel or titanium to a thickness of 10 μm or less, in order to easily relax stress due to external force applied after fabrication of a secondary battery.

It is needless to say that two or more of the above examples may be combined to relieve concentration of stress in the positive electrode tab.

Figure 6B:
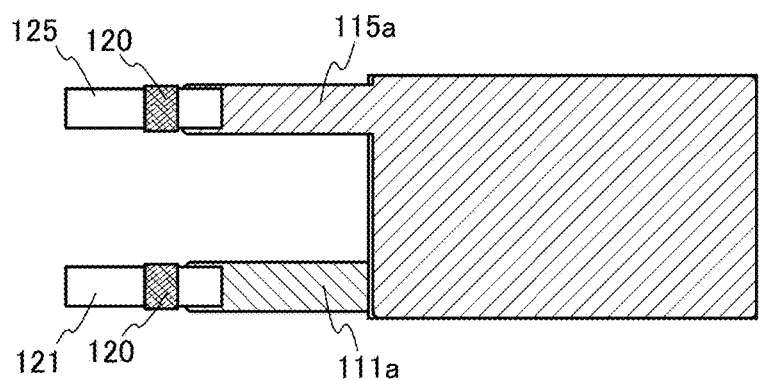

Then, in a manner similar to that of the positive electrode current collector 101, the negative electrode lead 125 including the sealing layer 120 is electrically connected to negative electrode tabs of the plurality of negative electrode current collectors 105 by ultrasonic welding (FIG. 6B). At this time, structures which can easily relax stress may be employed as in the case of the positive electrode tab; for example, the negative electrode tab is provided with a curved portion and the strength of the current collector is increased.

[5. Preparing Film for Exterior Body]

Figure 6C:
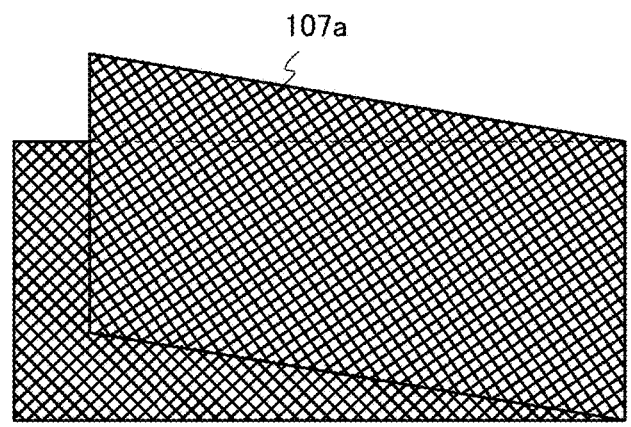

Next, a film 107a used for an exterior body is prepared and is folded (FIG. 6C).

[6. Bonding at One Side of Exterior Body]

Figure 7A:
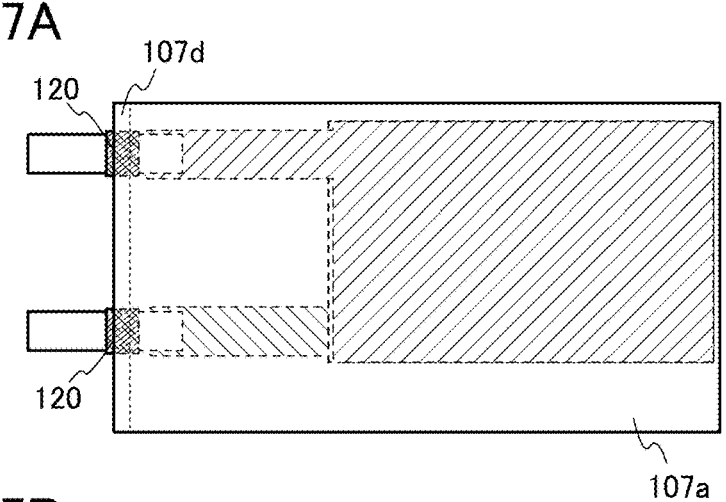
FIGS. 7A to 7C are top views illustrating a method for manufacturing a secondary battery of one embodiment of the present invention.

Next, the folded film 107a surrounds the positive electrode 111a, the positive electrode lead 121, the negative electrode 115a, and the negative electrode lead 125. Then, the surfaces at a side of the film 107a (a region 107d in FIG. 7A) are bonded to each other (FIG. 7A). The bonding can be performed by thermal welding, for example. Note that in FIGS. 7A to 7C and FIGS. 8A and 8B, unevenness of the film 107a and the exterior body 107 is not illustrated for simplification.

[7. Bonding at Another Side of Exterior Body and Injecting Electrolyte Solution]

Figure 7B:
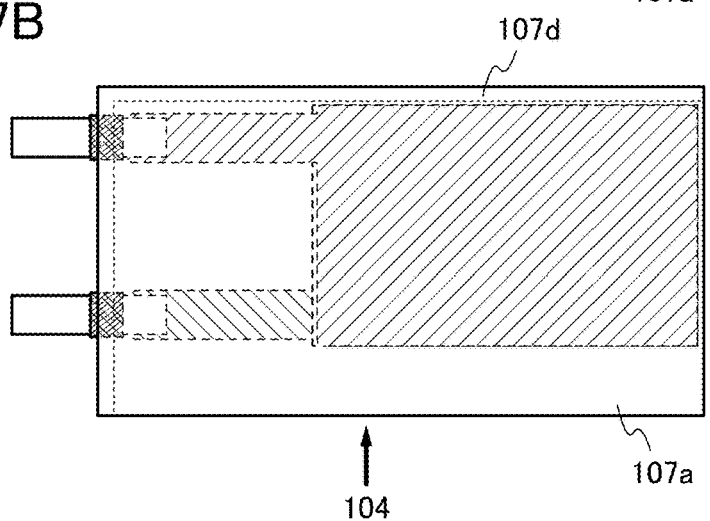

Next, the surfaces at another side of the film 107a (the region 107d in FIG. 7B) are bonded to each other. Then, the electrolyte solution 104 is injected to a region surrounded by the film 107a from a portion where the surfaces of the film 107a are not bonded (FIG. 7B).

[8. Sealing]

Figure 7C:
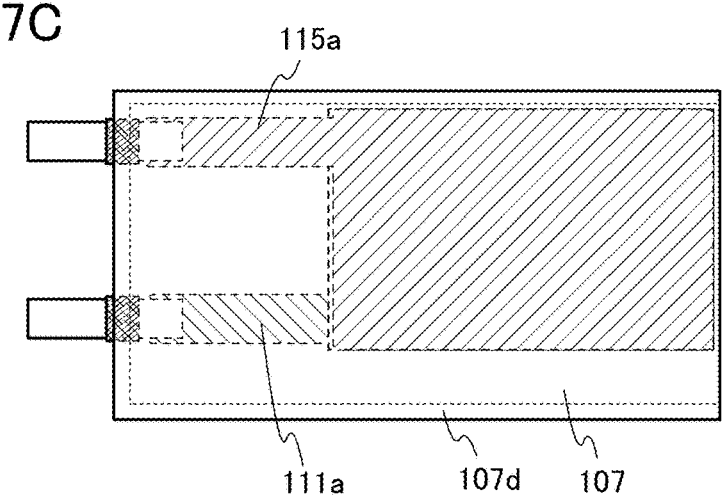

Next, the surfaces at the other side (the region 107d in FIG. 7C) of the film 107a are bonded by heating and pressing under vacuum, so that the film 107a becomes the sealed exterior body 107 (FIG. 7C). This treatment is performed in an environment from which oxygen and water are eliminated, for example, in a glove box. The evacuation to a vacuum is performed with a vacuum sealer, a liquid pouring sealer, or the like. Heating and pressing can be performed by setting the exterior body 107 between two heatable bars included in the sealer. An example of the conditions is as follows: the degree of vacuum is 60 kPa, the heating temperature is 190° C., the pressure is 0.1 MPa, and the time is 3 seconds. At this time, pressure is applied to the positive electrode and the negative electrode through the film 107a. The application of pressure enables removal of bubbles which enter between the positive electrode and the negative electrode when the electrolyte solution is injected.

[9. Aging]

Next, charging and discharging are preferably performed in aging treatment. In this specification and the like, the aging treatment refers to a step performed to detect an initial defect of a manufactured secondary battery and to form a stable film on a surface of a negative electrode active material in initial charging and discharging. Specifically, the aging treatment refers to steps of keeping a charging state for a long time, charging and discharging in one or more cycles, or the like at a temperature close to the upper limit of the operating temperature range of the battery. Moreover, a manufacturing process of a secondary battery may include a step of releasing gas generated in a region surrounded by the exterior body 107.

When a stable film is formed on the surface of the negative electrode active material in initial charging and discharging, consumption of carrier ions caused by further film formation in charging and discharging after that can be inhibited. Thus, by performing the aging treatment, the performance of a secondary battery can be more stabilized and a defective cell can be detected.

Figure 8A:
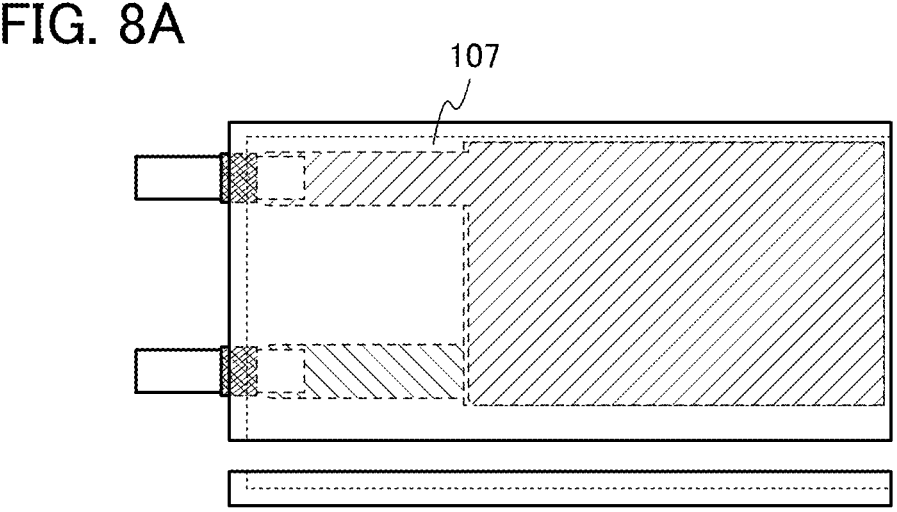
FIGS. 8A and 8B are top views illustrating a method for manufacturing a secondary battery of one embodiment of the present invention.

In this embodiment, after charging and discharging in one or more cycles, a part of the exterior body 107 is cut out and gas is released as illustrated in FIG. 8A.

[10. Resealing]

Figure 8B:
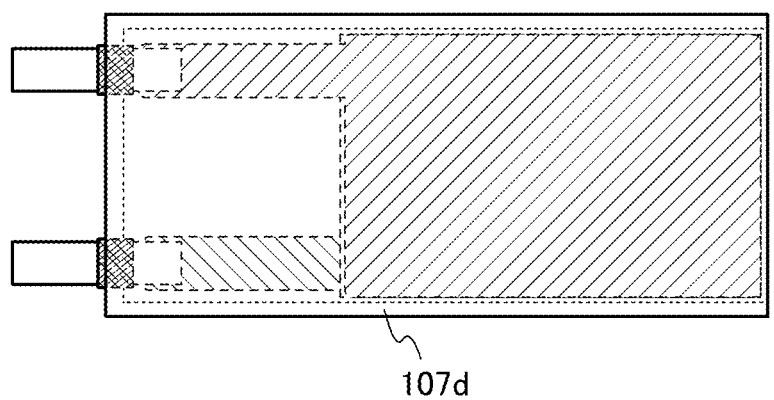

Next, the surfaces at the one side of the exterior body 107 cut out in the aging treatment (the region 107d in FIG. 8B) are resealed (FIG. 8B). Through the above-described process, the secondary battery 100a can be fabricated.

This embodiment can be implemented in appropriate combination with any of the other embodiments.

Embodiment 3

In this embodiment, materials which can be used in a secondary battery of one embodiment of the present invention are described in detail with reference to FIGS. 9A and 9B, FIGS. 10A and 10B, and FIGS. 21A and 21B.

[1. Positive Electrode]

The positive electrode 111 (the positive electrode 111a and the positive electrode 111b) includes the positive electrode current collector 101, the positive electrode active material layer 102 formed over the positive electrode current collector 101, and the like.

The positive electrode current collector 101 can be formed using a material that has high conductivity and is not eluted with the potential of the positive electrode, such as a metal like stainless steel, gold, platinum, aluminum, or titanium, or an alloy thereof. Alternatively, an aluminum alloy to which an element which improves heat resistance, such as silicon, titanium, neodymium, scandium, or molybdenum, is added can be used. Still alternatively, a metal element which forms silicide by reacting with silicon can be used. Examples of the metal element which forms silicide by reacting with silicon include zirconium, titanium, hafnium, vanadium, niobium, tantalum, chromium, molybdenum, tungsten, cobalt, nickel, and the like. The positive electrode current collector 101 can have a foil-like shape, a plate-like shape (a sheet-like shape), a net-like shape, a punching-metal shape, an expanded-metal shape, or the like as appropriate. The positive electrode current collector 101 preferably has a thickness greater than or equal to 5 μm and less than or equal to 30 μm. The surface of the positive electrode current collector 101 may be provided with an undercoat layer using graphite or the like.

The positive electrode active material layer 102 may further include, in addition to the positive electrode active material, a binder for increasing adhesion of the positive electrode active material, a conductive additive for increasing the conductivity of the positive electrode active material layer 102, and the like.

Examples of the positive electrode active material that can be used for the positive electrode active material layer 102 include a composite oxide with an olivine crystal structure, a composite oxide with a layered rock-salt crystal structure, and a composite oxide with a spinel crystal structure. For example, a compound such as $LiFeO_2$, $LiCoO_2$, $LiNiO_2$, $LiMn_2O_4$, $V_2O_5$, $Cr_2O_5$, or $MnO_2$ can be used.

In particular, LiCoO$_2$ is preferable because it has high capacity and higher stability in the air and higher thermal stability than LiNiO$_2$, for example.

It is preferable to add a small amount of lithium nickel oxide (LiNiO$_2$ or LiNi$_{1-x}$M$_x$O$_2$ (M=Co, Al, or the like)) to a lithium-containing material with a spinel crystal structure which contains manganese such as LiMn$_2$O$_4$ because characteristics of the secondary battery using such a material can be improved.

In addition, a lithium-manganese composite oxide that is represented by a composition formula Li$_a$Mn$_b$M$_c$O$_d$ can be used as the positive electrode active material. Here, the element M is preferably silicon, phosphorus, or a metal element other than lithium and manganese, and further preferably nickel. Furthermore, it is preferable to satisfy the following at the time of discharging in the case where a whole particle of a lithium-manganese composite oxide is measured: 0<a/(b+c)<2; c>0; and 0.26 (b+c)/d<0.5. Note that the composition ratios of metal, silicon, phosphorus, and the like in the whole particle of a lithium-manganese composite oxide can be measured with, for example, an inductively coupled plasma mass spectrometer (ICP-MS). The composition ratio of oxygen in the whole particle of a lithium-manganese composite oxide can be measured by, for example, energy dispersive X-ray spectroscopy (EDX). Alternatively, the composition ratio of oxygen in the whole particle of a lithium-manganese composite oxide can be measured by ICP-MS combined with fusion gas analysis and valence evaluation of X-ray absorption fine structure (XAFS) analysis. Note that the lithium-manganese composite oxide is an oxide containing at least lithium and manganese, and may contain at least one selected from chromium, cobalt, aluminum, nickel, iron, magnesium, molybdenum, zinc, indium, gallium, copper, titanium, niobium, silicon, phosphorus, and the like.

To achieve high capacity, the lithium-manganese composite oxide preferably includes a region where the surface portion and the middle portion are different in the crystal structure, the crystal orientation, or the oxygen content. In order that such a lithium-manganese composite oxide can be obtained, the composition formula is preferably Li$_a$Mn$_b$Ni$_c$O$_d$ satisfying the following: 1.6≤a≤1.848; 0.19≤c/b≤0.935; and 2.5≤d≤3. Further, it is particularly preferable to use a lithium-manganese composite oxide represented by a composition formula Li$_{1.68}$Mn$_{0.8062}$Ni$_{0.318}$O$_3$. In this specification and the like, a lithium-manganese composite oxide represented by a composition formula Li$_{1.68}$Mn$_{0.8062}$Ni$_{0.318}$O$_3$ refers to that formed at a ratio (molar ratio) of the amounts of raw materials of Li$_2$CO$_3$:MnCO$_3$:NiO=0.84:0.8062:0.318. Although this lithium-manganese composite oxide is represented by a composition formula Li$_{1.68}$Mn$_{0.8062}$Ni$_{0.318}$O$_3$, the composition might be different.

Figure 9A:
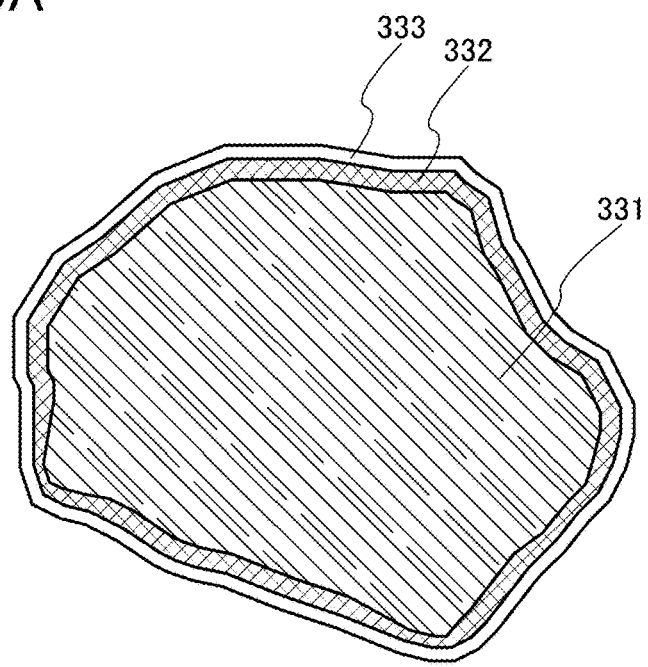
FIGS. 9A and 9B are cross-sectional views each illustrating a positive electrode active material which can be used in a secondary battery.
Figure 9B:
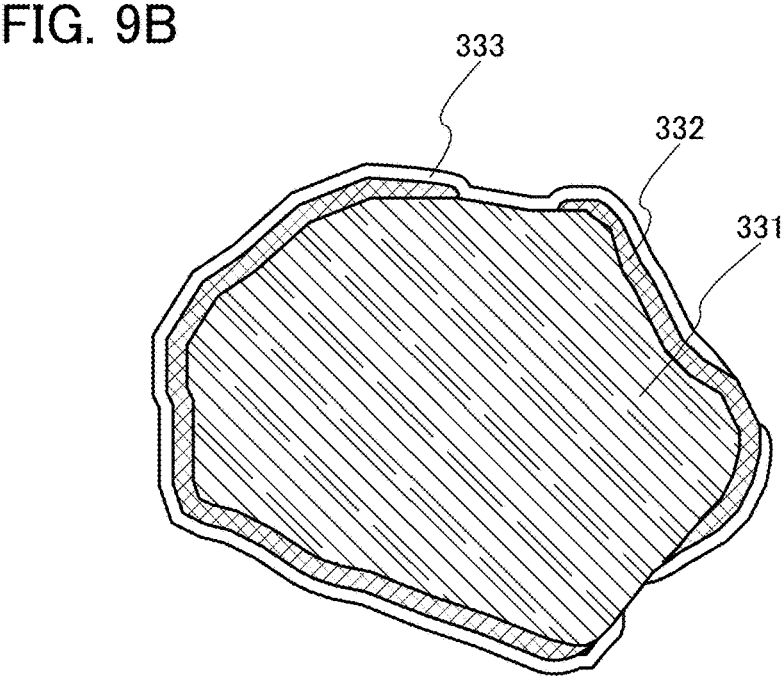

FIGS. 9A and 9B illustrate examples of a cross-sectional view of a particle of a lithium-manganese composite oxide having a region with a different crystal structure, crystal orientation, or oxygen content.

As illustrated in FIG. 9A, the lithium-manganese composite oxide having a region with different crystal structure, crystal orientation, or oxygen content preferably has a first region 331, a second region 332, and a third region 333. The second region 332 is in contact with at least part of the outside of the first region 331. Here, the term "outside" refers to the side closer to a surface of a particle. The third region 333 preferably includes a region corresponding to a surface of a particle containing the lithium manganese composite oxide.

As illustrated in FIG. 9B, the first region 331 may include a region not covered with the second region 332. The second region 332 may include a region not covered with the third region 333. For example, the first region 331 may include a region in contact with the third region 333. The first region 331 may include a region covered with neither the second region 332 nor the third region 333.

The second region 332 preferably has composition different from that of the first region 331.

For example, the case is described where the composition of the first region 331 and that of the second region 332 are separately measured and the first region 331 and the second region 332 each contain lithium, manganese, the element M, and oxygen; the atomic ratio of lithium to manganese, the element M and oxygen in the first region 331 is represented by a1:b1:c1:d1; and the atomic ratio of lithium to manganese, the element M, and oxygen in the second region 332 is represented by a2:b2:c2:d2. Note that the composition of each of the first region 331 and the second region 332 can be measured by, for example, energy dispersive X-ray spectroscopy (EDX) using a transmission electron microscope (TEM). In measurement by EDX, the composition ratio of lithium is sometimes difficult to measure. Thus, a difference between the first region 331 and the second region 332 in composition ratios of elements other than lithium is described below. Here, d1/(b1+c1) is preferably greater than or equal to 2.2, further preferably greater than or equal to 2.3, and still further preferably greater than or equal to 2.35 and less than or equal to 3. Furthermore, d2/(b2+c2) is preferably less than 2.2, further preferably less than 2.1, and still further preferably greater than or equal to 1.1 and less than or equal to 1.9. Also in this case, the composition of a whole particle of the lithium-manganese composite oxide including the first region 331 and the second region 332 preferably satisfies 0.26≤(b+c)/d<0.5 as described above.

The valence of manganese in the second region 332 may be different from that of manganese in the first region 331. The valence of the element M in the second region 332 may be different from that of the element M in the first region 331.

Specifically, the first region 331 is preferably a lithium-manganese composite oxide with a layered rock-salt crystal structure. The second region 332 is preferably a lithium-manganese composite oxide with a spinel crystal structure.

Here, in the case where the composition of the regions or valences of elements in the regions are spatially distributed, the composition or valences in a plurality of portions are obtained, the average values thereof are calculated, and the average values are regarded as the composition or valences of the regions, for example.

A transition layer may be provided between the second region 332 and the first region 331. Here, the transition layer is a region where composition is changed continuously or gradually, a region where a crystal structure is changed continuously or gradually, or a region where the lattice constant of a crystal is changed continuously or gradually. A mixed layer may be provided between the second region 332 and the first region 331. The mixed layer is a layer in which, for example, two or more crystals having different crystal orientations are mixed, two or more crystals having different crystal structures are mixed, or two or more crystals having different compositions are mixed.

The third region 333 preferably contains carbon or a metal compound. Examples of the metal include cobalt, aluminum, nickel, iron, manganese, titanium, zinc, and lithium.

The third region 333 may contain an oxide of the metal, a fluoride of the metal, or the like as an example of the metal compound.

It is particularly preferable that the third region 333 contain carbon. Since carbon has high conductivity, the particle coated with carbon in the electrode of the secondary battery can reduce the resistance of the electrode, for example. When the third region 333 contains carbon, the second region 332 in contact with the third region 333 can be oxidized. The third region 333 may contain graphene, graphene oxide, or graphene oxide subjected to reduction. Graphene and reduced graphene oxide have excellent electrical characteristics of high conductivity and excellent physical properties of high flexibility and high mechanical strength. Moreover, a particle of the lithium-manganese composite oxide can be coated efficiently.

When the third region 333 includes a carbon material such as graphene, the secondary battery using the lithium-manganese composite oxide as the positive electrode material can have improved cycle characteristics.

The thickness of a layer containing carbon is preferably greater than or equal to 0.4 nm and less than or equal to 40 nm.

Furthermore, the average size of primary particles of the lithium-manganese composite oxide is preferably greater than or equal to 5 nm and less than or equal to 50 µm and further preferably greater than or equal to 100 nm and less than or equal to 500 nm, for example. Furthermore, the specific surface area is preferably greater than or equal to 5 m²/g and less than or equal to 15 m²/g. Furthermore, the average size of secondary particles is preferably greater than or equal to 5 µm and less than or equal to 50 µm. Note that the average particle sizes can be measured with a particle size distribution analyzer or the like using a laser diffraction and scattering method or by observation with a scanning electron microscope (SEM) or a TEM. The specific surface area can be measured by a gas adsorption method.

Alternatively, a complex material ($LiMPO_4$ (general formula) (M is one or more of Fe(II), Mn(II), Co(II), and Ni(II))) can be used as the positive electrode active material. Typical examples of the general formula $LiMPO_4$ which can be used as a material are lithium compounds such as $LiFePO_4$, $LiNiPO_4$, $LiCoPO_4$, $LiMnPO_4$, $LiFe_aNi_bPO_4$, $LiFe_aCo_bPO_4$, $LiFe_aMn_bPO_4$, $LiNi_aCo_bPO_4$, $LiNi_aMn_bPO_4$ ($a+b \leq 1$, $0<a<1$, and $0<b<1$), $LiFe_cNi_dCo_ePO_4$, $LiFe_cNi_dMn_ePO_4$, $LiNi_cCo_dMn_ePO_4$ ($c+d+e \leq 1$, $0<c<1$, $0<d<1$, and $0<e<1$), and $LiFe_fNi_gCo_hMn_iPO_4$ ($f+g+h+i \leq 1$, $0<f<1$, $0<g<1$, $0<h<1$, and $0<i<1$).

$LiFePO_4$ is particularly preferable because it meets requirements with balance for a positive electrode active material, such as safety, stability, high capacity density, and the existence of lithium ions that can be extracted in initial oxidation (charging).

Alternatively, a complex material such as $Li_{(2-j)}MSiO_4$ (general formula) (M is one or more of Fe(II), Mn(II), Co(II), and Ni(II); $0 \leq j \leq 2$) can be used. Typical examples of the general formula $Li_{(2-j)}MSiO_4$ which can be used as a material are lithium compounds such as $Li_{(2-j)}FeSiO_4$, $Li_{(2-j)}NiSiO_4$, $Li_{(2-j)}CoSiO_4$, $Li_{(2-j)}MnSiO_4$, $Li_{(2-j)}Fe_kNi_lSiO_4$, $Li_{(2-j)}Fe_kCo_lSiO_4$, $Li_{(2-j)}Fe_kMn_lSiO_4$, $Li_{(2-j)}Ni_kCo_lSiO_4$, $Li_{(2-j)}Ni_kMn_lSiO_4$ ($k+l \leq 1$, $0<k<1$, and $0<l<1$), $Li_{(2-j)}Fe_mNi_nCo_qSiO_4$, $Li_{(2-j)}Fe_mNi_nMn_qSiO_4$, $Li_{(2-j)}Ni_mCo_nMn_qSiO_4$ ($m+n+q$ 1, $0<m<1$, $0<n<1$, and $0<q<1$), and $Li_{(2-j)}Fe_rNi_sCo_tMn_uSiO_4$ ($r+s+t+u$ 1, $0<r<1$, $0<s<1$, $0<t<1$, and $0<u<1$).

Still alternatively, a nasicon compound expressed by $A_xM_2(XO_4)_3$ (general formula) (A=Li, Na, or Mg, M=Fe, Mn, Ti, V, or Nb, X=S, P, Mo, W, As, or Si) can be used for the positive electrode active material. Examples of the nasicon compound are $Fe_2(MnO_4)_3$, $Fe_2(SO_4)_3$, and $Li_3Fe_2(PO_4)_3$. Still further alternatively, compounds represented by a general formula, $Li_2MPO_4F$, $Li_2MP_2O_7$, and $Li_5MO_4$ (M=Fe or Mn), a perovskite fluoride such as $NaFeF_3$ and $FeF_3$, a metal chalcogenide (a sulfide, a selenide, and a telluride) such as $TiS_2$ and $MoS_2$, an oxide with an inverse spinel crystal structure such as $LiMVO_4$, a vanadium oxide based material (e.g., $V_2O_5$, $V_6O_{13}$, and $LiV_3O_8$), a manganese oxide, and an organic sulfur compound can be used as the positive electrode active material, for example.

In the case where carrier ions are alkali metal ions other than lithium ions or alkaline-earth metal ions, the positive electrode active material contains, instead of lithium, an alkali metal (e.g., sodium or potassium) or an alkaline-earth metal (e.g., calcium, strontium, barium, beryllium, or magnesium). For example, the positive electrode active material may be a layered oxide containing sodium such as $NaFeO_2$ or $Na_{2/3}[Fe_{1/2}Mn_{1/2}]O_2$.

Note that although not illustrated, a conductive material such as a carbon layer may be provided on a surface of the positive electrode active material layer 102. With the conductive material such as the carbon layer, conductivity of the electrode can be increased. For example, the positive electrode active material layer 102 can be coated with the carbon layer by mixing a carbohydrate such as glucose at the time of baking the positive electrode active material.

The average particle diameter of the primary particle of the positive electrode active material layer 102 is preferably greater than or equal to 50 nm and less than or equal to 100 µm.

Examples of the conductive additive include a carbon material, a metal material, and a conductive ceramic material. Alternatively, a fiber material can be used as the conductive additive. The content of the conductive additive in the active material layer is preferably greater than or equal to 1 wt % and less than or equal to 10 wt % and further preferably greater than or equal to 1 wt % and less than or equal to 5 wt %.

A network for electrical conduction can be formed in the electrode by the conductive additive. The conductive additive also allows maintaining of a path for electric conduction between the particles of the active material. The addition of the conductive additive to the active material layer increases the electrical conductivity of the active material layer.

Examples of the conductive additive include natural graphite, artificial graphite such as mesocarbon microbeads, and carbon fiber. Examples of carbon fiber include mesophase pitch-based carbon fiber, isotropic pitch-based carbon fiber, carbon nanofiber, and carbon nanotube. Carbon nanotube can be formed by, for example, a vapor deposition method. Other examples of the conductive additive include carbon materials such as carbon black (e.g., acetylene black (AB)), graphite (black lead) particles, graphene, and fullerene. Alternatively, metal powder or metal fibers of copper, nickel, aluminum, silver, gold, or the like, a conductive ceramic material, or the like can be used.

Flaky graphene has an excellent electrical characteristic of high conductivity and excellent physical properties of high flexibility and high mechanical strength. Thus, the use of graphene as the conductive additive can increase contact points and the contact area of active materials.

Note that graphene in this specification includes single-layer graphene and multilayer graphene including two to hundred layers. Single-layer graphene refers to a one-atom-thick sheet of carbon molecules having π bonds. Graphene oxide refers to a compound formed by oxidation of such graphene. When graphene oxide is reduced to form graphene, oxygen contained in the graphene oxide is not entirely released and part of the oxygen remains in the graphene. In the case where graphene contains oxygen, the proportion of oxygen in the graphene measured by XPS is higher than or equal to 2 atomic % and lower than or equal to 11 atomic %, preferably higher than or equal to 3 atomic % and lower than or equal to 10 atomic %.

Graphene is capable of making low-resistance surface contact and has extremely high conductivity even with a small thickness. Therefore, even a small amount of graphene can efficiently form a conductive path in an active material layer.

In the case where an active material with a small average particle size (e.g., 1 μm or less) is used, the specific surface area of the active material is large and thus more conductive paths for the active materials are needed. In such a case, it is particularly preferable to use graphene with extremely high conductivity that can efficiently form a conductive path even in a small amount.

A cross-sectional structure example of a positive electrode active material layer containing graphene as a conductive additive is described below. Note that a negative electrode active material layer may contain graphene as a conductive additive.

Figure 10A:
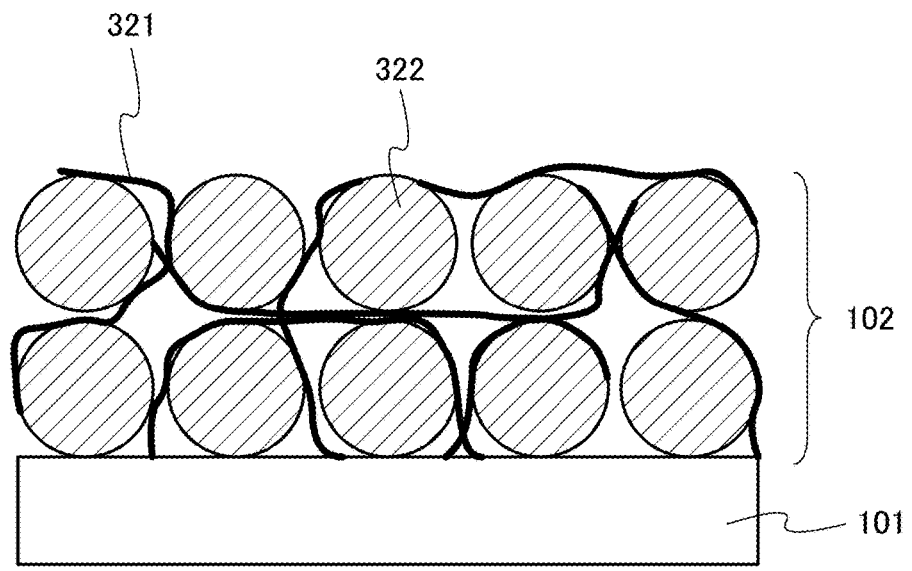
FIGS. 10A and 10B are cross-sectional views illustrating a conductive additive and the like which can be used in a secondary battery.

FIG. 10A is a longitudinal sectional view illustrating the positive electrode active material layer 102 and the positive electrode current collector 101. The positive electrode active material layer 102 includes positive electrode active material particles 322, graphene flakes 321 as a conductive additive, and a binder (not illustrated).

In the longitudinal section of the positive electrode active material layer 102, as illustrated in FIG. 10A, the sheet-like graphene flakes 321 in the positive electrode active material layer 102 substantially uniformly cover the positive electrode active materials such that surface contact is made. The graphene flakes 321 are schematically shown by thick lines in FIG. 10A but are actually thin films each having a thickness corresponding to the thickness of a single layer or a multi-layer of carbon molecules. The plurality of graphene flakes 321 are formed in such a way as to wrap, cover, or adhere to the surfaces of the plurality of positive electrode active material particles 322, so that the graphene flakes 321 make surface contact with the positive electrode active material particles 322. Furthermore, the graphene flakes 321 are also in surface contact with each other; consequently, the plurality of graphene flakes 321 form a three-dimensional network for electric conduction.

This is because graphene oxide with extremely high dispersibility in a polar solvent is used for the formation of the graphene flakes 321. The dispersion medium is removed by volatilization from a suspension in which graphene oxide is uniformly dispersed, and the graphene oxide is reduced to graphene; hence, the graphene flakes 321 remaining in the positive electrode active material layer 102 partly overlap with each other and cover the positive electrode active material such that surface contact is made, thereby forming an electrical conduction path. Then, graphene oxide can be reduced by heat treatment or with the use of a reducing agent, for example.

Unlike a conventional conductive additive in the form of particles, such as acetylene black, which makes point contact with an active material, the graphene flake 321 is capable of making low-resistance surface contact; accordingly, the electrical conduction between the positive electrode active material particles 322 and the graphene flakes 321 can be improved without an increase in the amount of a conductive additive. Thus, the proportion of the positive electrode active material particles 322 in the positive electrode active material layer 102 can be increased. Accordingly, the discharge capacity of a secondary battery can be increased.

Graphene flakes are bonded to each other to form net-like graphene (hereinafter referred to as a graphene net). The graphene net covering the active material can function as a binder for binding particles. The amount of a binder can thus be reduced, or the binder does not have to be used. This can increase the proportion of the active material in the electrode volume or weight. That is to say, the capacity of the secondary battery can be increased.

A structure where a positive active material layer or a negative active material layer contains graphene as a conductive additive as described above is particularly effective for a curved or flexible secondary battery.

Figure 21A:
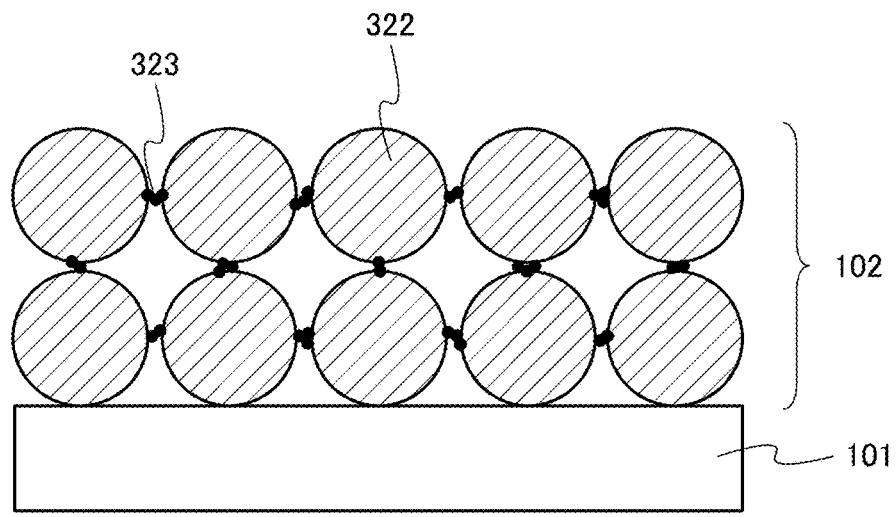

FIG. 21A is a longitudinal sectional view illustrating the positive electrode active material layer 102 and the positive electrode current collector 101 of the case where conductive additive particles 323 such as acetylene black are used, as a conventional example. A network for electrical conduction is formed between the positive electrode active material particles 322 by contact with the conductive additive particles 323.

Figure 21B:
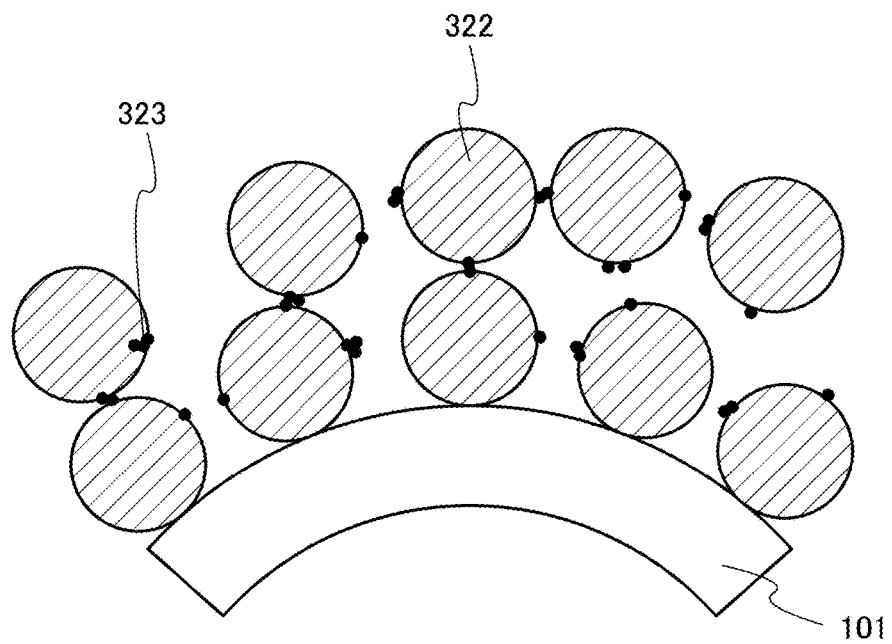

FIG. 21B shows the case where the positive electrode active material layer 102 and the positive electrode current collector 101 in FIG. 21A are curved. As illustrated in FIG. 21B, when the conductive additive particles 323 are used as a conductive additive, the distance between the positive electrode active material particles 322 is changed because of curving of the positive electrode active material layer 102, and part of the network for electrical conduction between the positive electrode active material particles 322 may be broken.

Figure 10B:
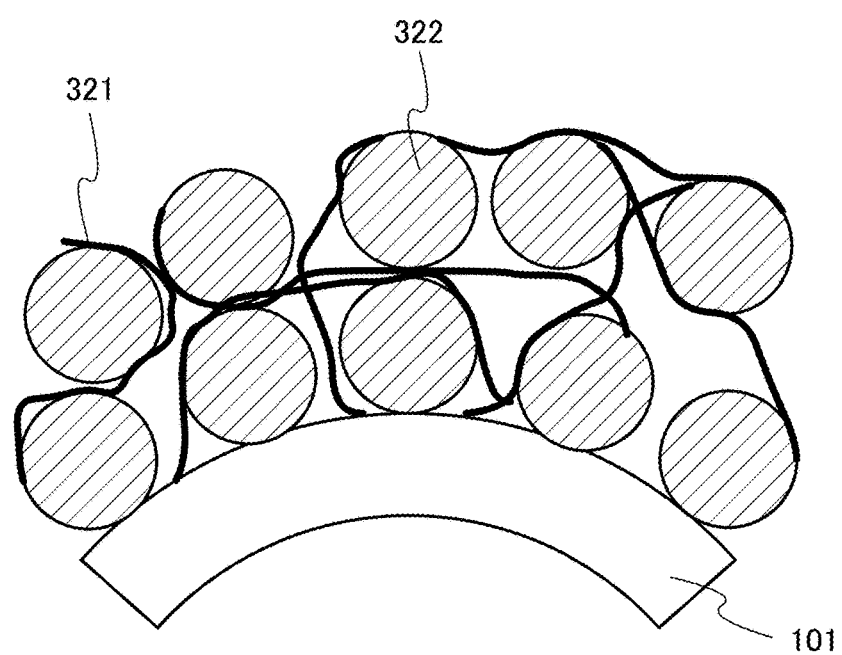

In contrast, FIG. 10B shows the case where the positive electrode current collector 101 and the positive electrode active material layer 102, which contains graphene as a conductive additive, in FIG. 10A are curved. Even when the distance between the positive electrode active material particles 322 is changed because of curving of the positive electrode active material layer 102 as in FIG. 10B, the network for electrical conduction can be maintained because graphene is a flexible sheet.

Various methods can be used for forming an electrode which is used for the secondary battery of one embodiment of the present invention. For example, in the case where an active material layer is formed over a current collector by a coating method, the active material, the binder, the conductive additive, and the dispersion medium (also referred to as a solvent) are mixed to form a paste, the paste is applied to the current collector, and the dispersion medium is vaporized. After that, the active material layer may be pressed by a compression method such as a roll press method or a flat plate press method so as to be consolidated if necessary.

As the dispersion medium, water, a polar organic solvent such as N-methylpyrrolidone (NMP) or dimethylformamide can be used, for example. Water is preferably used in terms of the safety and cost.

It is preferable for the binder to include, for example, water-soluble polymers. As the water-soluble polymers, a polysaccharide or the like can be used, for example. As the polysaccharide, a cellulose derivative such as carboxymethyl cellulose (CMC), methyl cellulose, ethyl cellulose, hydroxypropyl cellulose, diacetyl cellulose, or regenerated cellulose, starch, or the like can be used.

As the binder, a rubber material such as styrene-butadiene rubber (SBR), styrene-isoprene-styrene rubber, acrylonitrile-butadiene rubber, butadiene rubber, fluorine rubber, or ethylene-propylene-diene copolymer is preferably used. Any of these rubber materials is further preferably used in combination with the aforementioned water-soluble polymers.

Alternatively, as the binder, a material such as polystyrene, poly(methyl acrylate), poly(methyl methacrylate) (PMMA), sodium polyacrylate, polyvinyl alcohol (PVA), polyethylene oxide (PEO), polypropylene oxide, polyimide, polyvinyl chloride, polytetrafluoroethylene, polyethylene, polypropylene, isobutyl ene, polyethylene terephthalate, nylon, polyvinylidene fluoride (PVdF), polyacrylonitrile (PAN), polyvinyl chloride, ethylene-propylene-diene polymer, polyvinyl acetate, polymethyl methacrylate, or nitrocellulose is preferably used.

Two or more of the above materials can be used in combination for the binder.

The content of the binder in the positive electrode active material layer 102 is preferably greater than or equal to 1 wt % and less than or equal to 10 wt %, further preferably greater than or equal to 2 wt % and less than or equal to 8 wt %, and still further preferably greater than or equal to 3 wt % and less than or equal to 5 wt %. The content of the conductive additive in the positive electrode active material layer 102 is preferably greater than or equal to 1 wt % and less than or equal to 10 wt % and further preferably greater than or equal to 1 wt % and less than or equal to 5 wt %.

In the case where the positive electrode active material layer 102 is formed by a coating method, the positive electrode active material, the binder, and the conductive additive are mixed to form a positive electrode paste (slurry), and the positive electrode paste is applied to the positive electrode current collector 101 and dried.

[2. Negative Electrode]

The negative electrode 115 (the negative electrode 115a and the negative electrode 115b) includes, for example, the negative electrode current collector 105 and the negative electrode active material layer 106 formed on the negative electrode current collector 105.

The negative electrode current collector 105 can be formed using a material that has high conductivity and is not alloyed with a carrier ion of lithium or the like, such as a metal like stainless steel, gold, platinum, iron, copper, titanium, or an alloy thereof. Alternatively, an aluminum alloy to which an element which improves heat resistance, such as silicon, titanium, neodymium, scandium, or molybdenum, is added can be used. The negative electrode current collector 105 can have a foil-like shape, a plate-like shape (sheet-like shape), a net-like shape, a punching-metal shape, an expanded-metal shape, or the like as appropriate. The negative electrode current collector 105 has a thickness greater than or equal to 5 µm and less than or equal to 30 µm. The surface of the negative electrode current collector 105 may be provided with an undercoat layer using graphite or the like.

The negative electrode current collector is preferably formed using a high-strength material such as stainless steel or titanium because the negative electrode current collector can resist the change in the shape caused by expansion of the negative electrode active material layer. Particularly in the case where the negative electrode active material is formed using a material whose volume is largely changed due to charging and discharging, such as a material containing silicon, the above negative electrode current collector is preferable.

The negative electrode active material layer 106 may further include, in addition to the negative electrode active material, a binder for increasing adhesion of the negative electrode active material, a conductive additive for increasing the conductivity of the negative electrode active material layer 106, and the like. For the materials of the binder and the conductive additive which are used for the negative electrode active material layer, the materials of the binder and the conductive additive which are used for the positive electrode active material layer are referred to.

A material with which lithium can be dissolved and precipitated or a material which can reversibly react with lithium ions can be used for a negative electrode active material; for example, a lithium metal, a carbon-based material, an alloy-based material, or the like can be used.

The lithium metal is preferable because of its low redox potential (3.045 V lower than that of a standard hydrogen electrode) and high specific capacity per unit weight and per unit volume (3860 mAh/g and 2062 mAh/cm$^3$).

Examples of the carbon-based material include graphite, graphitizing carbon (soft carbon), non-graphitizing carbon (hard carbon), a carbon nanotube, graphene, carbon black, and the like.

Examples of the graphite include artificial graphite such as meso-carbon microbeads (MCMB), coke-based artificial graphite, and pitch-based artificial graphite, and natural graphite such as spherical natural graphite.

Graphite has a low potential substantially equal to that of a lithium metal (0.1 V to 0.3 V vs. Li/Li$^+$) when lithium ions are intercalated into the graphite (while a lithium-graphite intercalation compound is formed). For this reason, a lithium-ion secondary battery can have a high operating voltage. In addition, graphite is preferable because of its advantages such as relatively high capacity per unit volume, small volume expansion, low cost, and safety greater than that of a lithium metal.

As the negative electrode active material, other than the above carbon materials, an alloy-based material which enables charge-discharge reaction by alloying and dealloying reaction with carrier ions can be used. In the case where carrier ions are lithium ions, for example, a material containing at least one of Mg, Ca, Al, Si, Ge, Sn, Pb, As, Sb, Bi, Ag, Au, Zn, Cd, Hg, In, and the like can be used as the alloy-based material. Such elements have higher capacity than carbon. In particular, silicon has a significantly high theoretical capacity of 4200 mAh/g. For this reason, silicon is preferably used as the negative electrode active material. Examples of an alloy-based material including such elements are $Mg_2Si$, $Mg_2Ge$, $Mg_2Sn$, $SnS_2$, $V_2Sn_3$, $FeSn_2$, $CoSn_2$, $Ni_3Sn_2$, $Cu_6Sn_5$, $Ag_3Sn$, $Ag_3Sb$, $Ni_2MnSb$, $CeSb_3$, $LaSn_3$, $La_3Co_2Sn_7$, $CoSb_3$, InSb, and SbSn.

Alternatively, for the negative electrode active material, an oxide such as SiO, SnO, $SnO_2$, titanium dioxide ($TiO_2$), lithium titanium oxide ($Li_4Ti_5O_{12}$), lithium-graphite intercalation compound ($Li_xC_6$), niobium pentoxide ($Nb_2O_5$), tungsten oxide ($WO_2$), or molybdenum oxide ($MoO_2$) can be used.

Note that SiO refers to the powder of a silicon oxide and can also be referred to as $SiO_y$ (2>y>0). SiO may include a silicon-rich portion. Examples of SiO include a material containing one or more of $Si_2O_3$, $Si_3O_4$, and $Si_2O$ and a mixture of Si powder and silicon dioxide ($SiO_2$). Furthermore, SiO may contain another element (e.g., carbon, nitrogen, iron, aluminum, copper, titanium, calcium, and manganese). In other words, SiO refers to a colored material containing two or more of single crystal silicon, amorphous silicon, polycrystal silicon, $Si_2O_3$, $Si_3O_4$, $Si_2O$, and $SiO_2$.

Thus, SiO can be distinguished from $SiO_x$ (x is 2 or more), which is clear and colorless or white. Note that in the case where a secondary battery is fabricated using SiO as a material thereof and the SiO is oxidized because of repeated charge and discharge cycles, SiO is changed into $SiO_2$ in some cases.

Still alternatively, as the negative electrode active material, $Li_{3-x}M_xN$ (M=Co, Ni, or Cu) with a $Li_3N$ structure, which is a nitride containing lithium and a transition metal, can be used. For example, $Li_{2.6}Co_{0.4}N_3$ is preferable because of high charge and discharge capacity (900 mAh/g and 1890 $mAh/cm^3$).

A nitride containing lithium and a transition metal is preferably used, in which case lithium ions are contained in the negative electrode active material and thus the negative electrode active material can be used in combination with a material for a positive electrode active material which does not contain lithium ions, such as $V_2O_5$ or $Cr_3O_8$. In the case of using a material containing lithium ions as a positive electrode active material, the nitride containing lithium and a transition metal can be used for the negative electrode active material by extracting the lithium ions contained in the positive electrode active material in advance.

Alternatively, a material which causes a conversion reaction can be used as the negative electrode active material. For example, a transition metal oxide with which an alloying reaction with lithium is not caused, such as cobalt oxide (CoO), nickel oxide (NiO), or iron oxide (FeO), is used for the negative electrode active material. Other examples of the material which causes a conversion reaction include oxides such as $Fe_2O_3$, CuO, $Cu_2O$, $RuO_2$, and $Cr_2O_3$, sulfides such as $CoS_{0.89}$, NiS, or CuS, nitrides such as $Zn_3N_2$, $Cu_3N$, and $Ge_3N_4$, phosphides such as $NiP_2$, $FeP_2$, and $CoP_3$, and fluorides such as $FeF_3$ and $BiF_3$. Note that any of the fluorides can be used as a positive electrode active material because of its high potential.

In the case where the negative electrode active material layer 106 is formed by a coating method, the negative electrode active material and the binder are mixed to form a negative electrode paste (slurry), and the negative electrode paste is applied to the negative electrode current collector 105 and dried.

Graphene can be formed on a surface of the negative electrode active material layer 106. In the case of using silicon as the negative electrode active material, the volume of silicon is greatly changed due to occlusion and release of carrier ions in charge-discharge cycles. Therefore, adhesion between the negative electrode current collector 105 and the negative electrode active material layer 106 is decreased, resulting in degradation of battery characteristics caused by charge and discharge. Thus, graphene is preferably formed on a surface of the negative electrode active material layer 106 containing silicon because even when the volume of silicon is changed in charge-discharge cycles, decrease in the adhesion between the negative electrode current collector 105 and the negative electrode active material layer 106 can be inhibited, which makes it possible to reduce degradation of battery characteristics.

Alternatively, a film of an oxide or the like can be formed on the surface of the negative electrode active material layer 106. A film formed by decomposition or the like of an electrolyte solution or the like in charging cannot release electric charges used at the formation, and therefore forms irreversible capacity. In contrast, the film of an oxide or the like provided on the surface of the negative electrode active material layer 106 in advance can reduce or prevent generation of irreversible capacity.

As the film covering the negative electrode active material layer 106, an oxide film of any one of niobium, titanium, vanadium, tantalum, tungsten, zirconium, molybdenum, hafnium, chromium, aluminum, and silicon or an oxide film containing any one of these elements and lithium can be used. Such a film is much denser than a conventional film formed on a surface of a negative electrode due to a decomposition product of an electrolyte solution.

For example, niobium oxide ($Nb_2O_5$) has a low electric conductivity of $10^{-9}$ S/cm and a high insulating property. For this reason, a niobium oxide film inhibits electrochemical decomposition reaction between the negative electrode active material and the electrolyte solution. On the other hand, niobium oxide has a lithium diffusion coefficient of $10^{-9}$ $cm^2$/sec and high lithium ion conductivity. Therefore, niobium oxide can transmit lithium ions. Alternatively, silicon oxide or aluminum oxide can be used for the film covering the negative electrode active material layer 106.

A sol-gel method can be used to cover the negative electrode active material layer 106 with the film, for example. The sol-gel method is a method for forming a thin film in such a manner that a solution of metal alkoxide, a metal salt, or the like is changed into a gel, which has lost its fluidity, by hydrolysis reaction and polycondensation reaction and the gel is baked. Since a thin film is formed from a liquid phase in the sol-gel method, raw materials can be mixed uniformly on the molecular scale. For this reason, by adding a negative electrode active material such as graphite to a raw material of the metal oxide film which is a solvent, the active material can be easily dispersed into the gel. In such a manner, the film can be formed on the surface of the negative electrode active material layer 106. A decrease in the capacity of the secondary battery can be prevented by using the film.

[3. Separator]

As a material of the separator 103, a porous insulator such as cellulose, polypropylene (PP), polyethylene (PE), polybutene, nylon, polyester, polysulfone, polyacrylonitrile, polyvinylidene fluoride, or tetrafluoroethylene can be used. Alternatively, nonwoven fabric of a glass fiber or the like, or a diaphragm in which a glass fiber and a polymer fiber are mixed can be used. Alternatively, to increase heat resistance, a polyester nonwoven fabric to which ceramic is applied or which is coated with aramid may be used as a separator.

[4. Electrolyte Solution]

As a solvent for the electrolyte solution 104 used in the secondary battery 100a, an aprotic organic solvent is preferably used. For example, one of ethylene carbonate (EC), propylene carbonate (PC), butylene carbonate, chloroethylene carbonate, vinylene carbonate, γ-butyrolactone, γ-valerolactone, dimethyl carbonate (DMC), diethyl carbonate (DEC), ethyl methyl carbonate (EMC), methyl formate, methyl acetate, methyl butyrate, 1,3-dioxane, 1,4-dioxane, dimethoxyethane (DME), dimethyl sulfoxide, diethyl ether, methyl diglyme, acetonitrile, benzonitrile, tetrahydrofuran, sulfolane, and sultone can be used, or two or more of these solvents can be used in an appropriate combination in an appropriate ratio.

When a gelled high-molecular material is used as the solvent for the electrolyte solution, safety against liquid leakage is improved. Further, a secondary battery can be thinner and more lightweight. Typical examples of gelled high-molecular material include a silicone gel, an acrylic gel, an acrylonitrile gel, a polyethylene oxide-based gel, a polypropylene oxide-based gel, a fluorine-based polymer gel, and the like.

Alternatively, the use of one or more ionic liquids (room temperature molten salts) which are less likely to burn and volatilize as the solvent for the electrolyte solution can prevent the secondary battery from exploding or catching fire even when the secondary battery internally shorts out or the internal temperature increases due to overcharging or the like.

In the case of using lithium ions as carriers, as an electrolyte dissolved in the above-described solvent, one of lithium salts such as $LiPF_6$, $LiClO_4$, $LiAsF_6$, $LiBF_4$, $LiAlCl_4$, LiSCN, LiBr, LiI, $Li_2SO_4$, $Li_2B_{10}Cl_{10}$, $Li_2B_{12}Cl_{12}$, $LiCF_3SO_3$, $LiC_4F_9SO_3$, $LiC(CF_3SO_2)_3$, $LiC(C_2F_5SO_2)_3$, $LiN(CF_3SO_2)_2$, $LiN(C_4F_9SO_2)(CF_3SO_2)$, and $LiN(C_2F_5SO_2)_2$ can be used, or two or more of these lithium salts can be used in an appropriate combination in an appropriate ratio.

The electrolyte solution used for the secondary battery preferably contains a small amount of dust particles and elements other than the constituent elements of the electrolyte solution (hereinafter, also simply referred to as impurities) so as to be highly purified. Specifically, the weight ratio of impurities to the electrolyte solution is less than or equal to 1%, preferably less than or equal to 0.1% and further preferably less than or equal to 0.01%. An additive agent such as vinylene carbonate may be added to the electrolyte solution.

[5. Exterior Body]

The secondary battery can have any of a variety of structures, and a film is used for the exterior body 107 in this embodiment. In particular, a metal foil laminate film in which a plastic film is stacked over metal foil can be used for sealing by thermocompression bonding and has advantages such as high flexibility in shape, light weight, and flexibility, which is preferable. For the metal foil contained in the metal foil laminate film, aluminum, stainless steel, tin, nickel steel, or the like can be used. For the plastic film stacked over the metal foil, polyethylene terephthalate, nylon, polyethylene, or the like can be used.

Note that in this specification and the like, "laminate" refers to a processing method by which thin materials, such as metal foil and a plastic film, are bonded so that they are stacked.

In some cases, the film used for the exterior body 107 is a stack of metal foil and a single-layer film selected from a hybrid material film containing an organic material (e.g., an organic resin or fiber) and an inorganic material (e.g., ceramic) and a carbon-containing inorganic film (e.g., a carbon film or a graphite film) or a stacked-layer film including two or more of the above films.

In addition, on the exterior body 107, depressions, projections, or depressions and projections are preferably formed by embossing or the like.

Forming depressions or projections on a surface of a film containing metal foil by embossing increases the surface area of the exterior body 107 exposed to outside air, achieving efficient heat dissipation.

In the case where the secondary battery 100 is changed in shape by externally applying force, compressive stress is applied to the inward exterior body 107 close to the flexural center, and tensile stress is applied to the outward exterior body 107 apart from the flexural center. Due to the stress, the exterior body 107 is strained and might be partly deformed or damaged. The secondary battery 100 is curved in one axis direction when changed in shape by externally applying force. Note that a curving direction refers to a direction in which end portions of the secondary battery that is curved are connected as shown by dashed-dotted line A1-A2 in FIG. 1B. In this specification, the center of a line connecting the end portions of the secondary battery is referred to as a flexural center.

Projections or depressions formed on the exterior body 107 by embossing or the like can increase the creeping distance of the exterior body 107 and can relax compressive stress and tensile stress per unit length. Therefore, the secondary battery 100 can be highly reliable.

Note that a "strain" is the scale of change in form indicating the displacement of a point of an object relative to the reference (initial) length of the object. The depression or the projection formed on the surface of the exterior body 107 can reduce the influence of a strain caused by application of external force to the secondary battery to an acceptable level.

This embodiment can be implemented in appropriate combination with any of the other embodiments.

Embodiment 4

1. Modification Example 1 of Electrode Portion

Figure 11A:
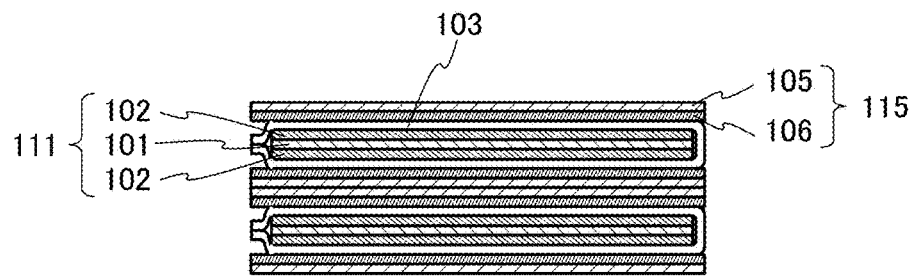
FIGS. 11A to 11C are cross-sectional views each illustrating a structure example of a secondary battery.

FIG. 11A shows an example of a stacked-layer structure of the positive electrodes 111 and the negative electrodes 115 which is different from that in FIGS. 1A to 1C. In FIG. 11A, two positive electrodes 111 each including the positive electrode active material layer 102 on both surfaces of the positive electrode current collector 101 and four negative electrodes 115 each including the negative electrode active material layer 106 on one surface of the negative electrode current collector 105 are stacked. Even in the structure in FIG. 11A, a contact surface between metals such as a contact surface between surfaces of the negative electrodes 115 on which a negative electrode active material is not provided can be formed.

2. Modification Example 2 of Electrode Portion

Figure 11B:
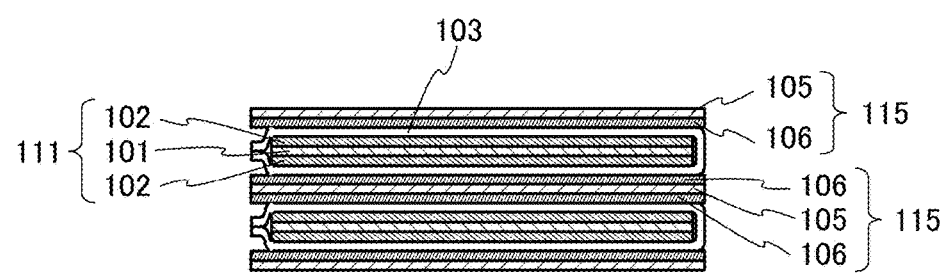

FIG. 11B shows an example of a stacked-layer structure of the positive electrodes 111 and the negative electrodes 115 which is different from that in FIGS. 1A to 1C. In FIG. 11B, two positive electrodes 111 each including the positive electrode active material layer 102 on both surfaces of the positive electrode current collector 101, two negative electrodes 115 each including the negative electrode active material layer 106 on one surface of the negative electrode current collector 105, and one negative electrode 115 including the negative electrode active material layer 106 on both surfaces of the negative electrode current collector 105 are stacked. When the active material layer is provided on the both surfaces of the current collector as illustrated in FIG. 11B, capacity of the secondary battery 100 per unit volume can be increased.

3. Modification Example 3 of Electrode Portion

Figure 11C:
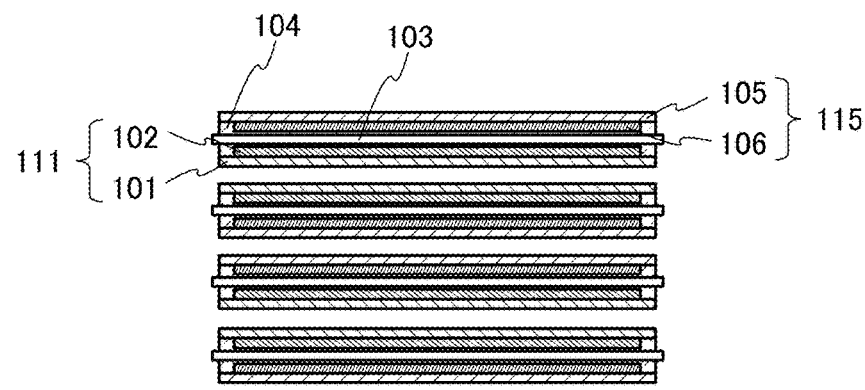

FIG. 11C shows an example of a stacked-layer structure of the positive electrodes 111 and the negative electrodes 115 which is different from that in FIGS. 1A to 1C. In FIG. 11C, the electrolyte solution 104, which is an electrolyte solution including a polymer, bonds a set of the positive electrode 111, the negative electrode 115, and the separator 103. With such a structure, the slide between the positive electrode 111 and the negative electrode 115 where a battery reaction occurs can be prevented when the secondary battery 100 is curved.

Many contact surfaces between metals, such as a contact surface between surfaces of the positive electrodes 111 on which a positive electrode active material is not provided and a contact surface between surfaces of the negative electrodes 115 on which a negative electrode active material is not provided can be obtained. These contact surfaces slide on each other when the secondary battery 100 is curved, so that stress caused by the difference between the inner diameter and the outer diameter of a curved portion can be reduced.

Therefore, the deterioration of the secondary battery 100 can be further suppressed. In addition, the secondary battery 100 can be more reliable.

As the polymer included in the electrolyte solution 104 in FIG. 11C, a polyethylene oxide-based polymer, a polyacrylonitrile-based polymer, a polyvinylidene fluoride-based polymer, a polyacrylate based polymer, or a polymethylmethacrylate-based polymer can be used. A polymer which can gel the electrolyte solution 104 at normal temperature (e.g., 25° C.) is preferably used. In this specification and the like, the term polyvinylidene fluoride-based polymer, for example, refers to a polymer including polyvinylidene fluoride (PVDF), and includes a poly(vinylidene fluoride-hexafluoropropylene) copolymer and the like.

The above polymer can be qualitatively analyzed using a Fourier transform infrared (FT-IR) spectrometer or the like. For example, the polyvinylidene fluoride-based polymer has an absorption peak showing a C—F bond in a spectrum obtained with the FT-IR spectrometer. Furthermore, the polyacrylonitrile-based polymer has an absorption peak showing a C≡N bond in a spectrum obtained by the FT-IR spectrometer.

The description of FIGS. 1A to 1C can be referred to except for a method for stacking the positive electrodes 111 and the negative electrodes 115.

4. Modification Example 1 of Separator Shape and the Like

Figure 12A:
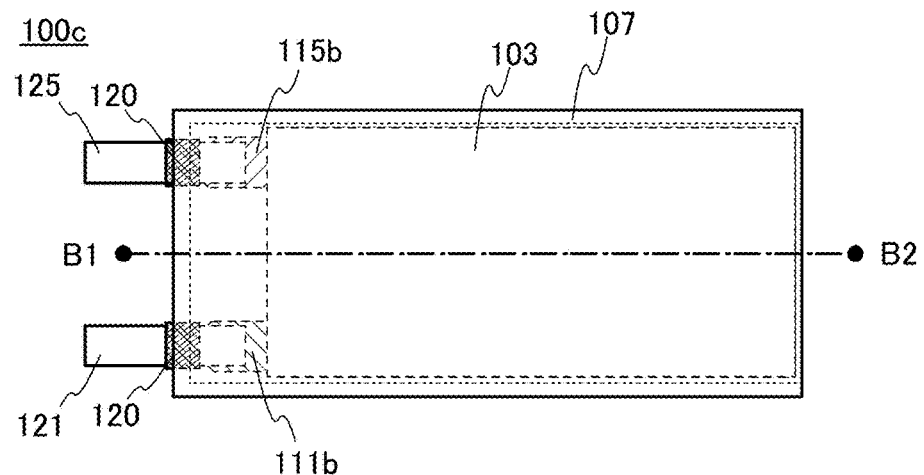
FIGS. 12A to 12C are a top view, a cross-sectional view, and a perspective view illustrating a structure example of a secondary battery.
Figure 12B:
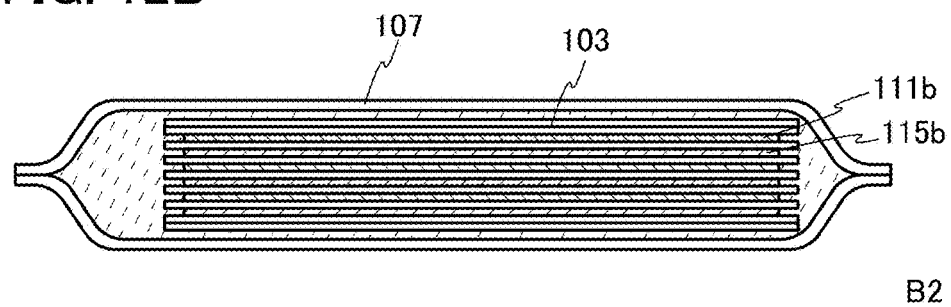
Figure 12C:
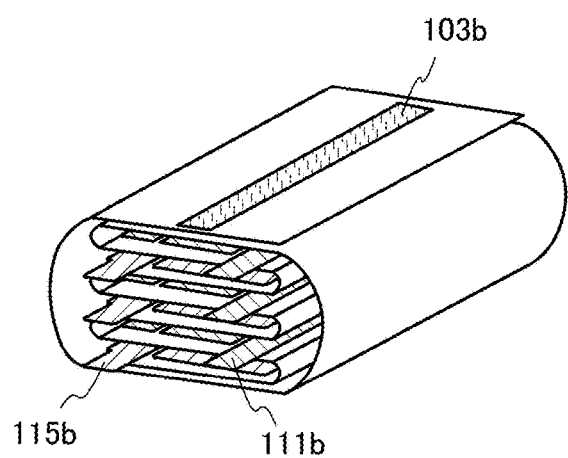

FIGS. 12A to 12C illustrate a secondary battery 100c different from the secondary battery in FIGS. 1A to 1C. FIG. 12A is a top view of the secondary battery 100c. FIG. 12B is a cross-sectional view taken along dashed-dotted line B1-B2 in FIG. 12A. FIG. 12C is a perspective view illustrating a positive electrode 111b, a negative electrode 115b, and a separator 103 of the secondary battery 100c.

The secondary battery 100c illustrated in FIGS. 12A to 12C is different from the secondary battery 100a illustrated in FIGS. 1A to 1C mainly in the positions of the positive electrodes 111, the negative electrodes 115, and the shape of the separator 103.

Now, some steps in a method for fabricating the secondary battery 100c illustrated in FIGS. 12A to 12C are described with reference to FIGS. 13A and 13B.

Figure 13A:
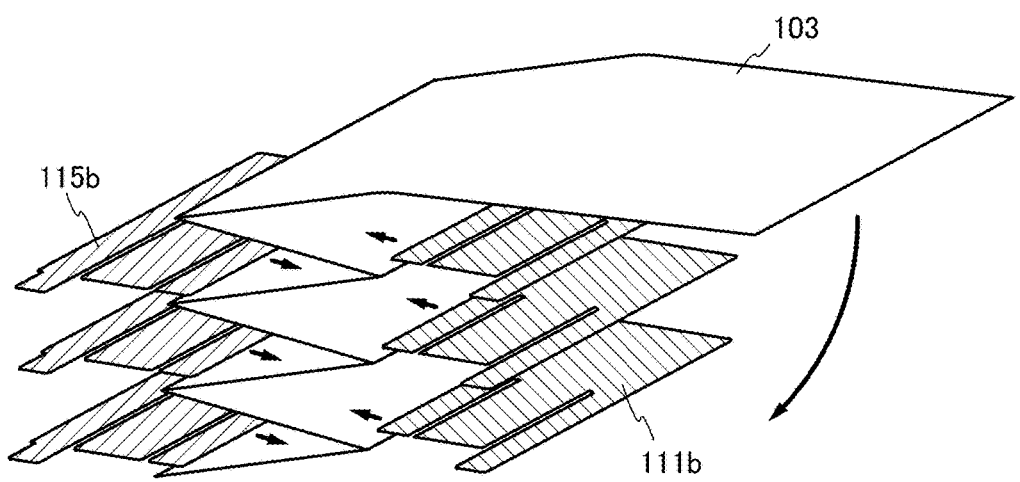
FIGS. 13A and 13B illustrate an example of a method for manufacturing a secondary battery.

First, as illustrated in FIG. 13A, the positive electrodes 111b and the negative electrodes 115b are alternately sandwiched by the separator 103 that is repeatedly folded such that the negative electrode active material layer 106 in the negative electrode 115b overlaps with the separator 103 and the positive electrode active material layer 102 in the positive electrode 111b overlaps with the separator 103. In the case where an electrode in which only one surface of a current collector is provided with an active material layer is used, the positive electrode active material layer 102 of the positive electrode 111b and the negative electrode active material layer 106 of the negative electrode 115b are positioned so as to face each other with the separator 103 provided therebetween.

Figure 13B:
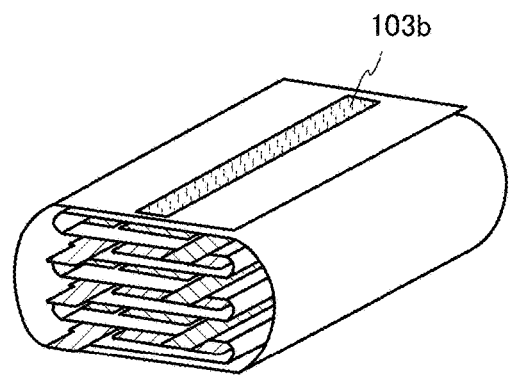

Next, as illustrated in FIG. 13B, the plurality of positive electrodes 111b and the plurality of negative electrodes 115b are covered with the separator 103.

Then, a region where the separator 103 overlaps with itself, e.g., a region 103b in FIG. 13B, is thermally welded, and the plurality of positive electrodes 111b and the plurality of negative electrodes 115b are covered with the separator 103 to be bound.

Note that the plurality of positive electrodes 111b, the plurality of negative electrodes 115b, and the separator 103 are bound with a binding material.

Since the positive electrodes 111b and the negative electrodes 115b are stacked through the above steps, one separator 103 has regions sandwiched between the plurality of positive electrodes 111b and the plurality of negative electrodes 115b and regions positioned so as to cover the plurality of positive electrodes 111b and the plurality of negative electrodes 115b.

In other words, the separator 103 included in the secondary battery 100c in FIGS. 12A to 12C is a single separator which is partly folded. In the folded parts of the separator 103, the plurality of positive electrodes 111b and the plurality of negative electrodes 115b are sandwiched.

The description of FIGS. 1A to 1C can be referred to except for the shape of the separator 103 of the secondary battery 100c.

5. Modification Example 2 of Separator Shape and the Like

Figure 14A:
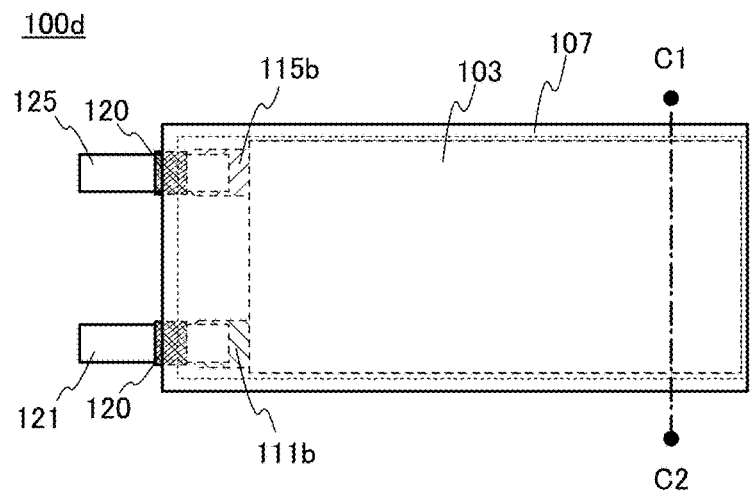
Figure 14A:
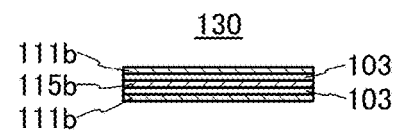
Figure 14A:
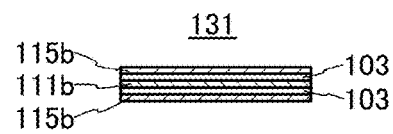
Figure 14C:
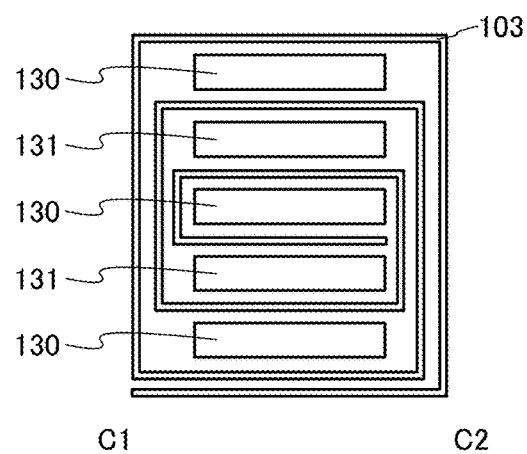

FIGS. 14A, 14B1, 14B2, and 14C illustrate a secondary battery 100d different from the secondary battery in FIGS. 12A to 12C. FIG. 14A is a top view of the secondary battery 100d. FIG. 14B1 is a cross-sectional view of a first electrode assembly 130, and FIG. 14B2 is a cross-sectional view of a second electrode assembly 131. FIG. 14C is a cross-sectional view taken along dashed-dotted line C1-C2 in FIG. 14A. In FIG. 14C, the first electrode assembly 130, the second electrode assembly 131, and the separator 103 are selectively illustrated for the sake of clarity.

The secondary battery 100d illustrated in FIGS. 14A, 14B1, 14B2, and 14C is different from the secondary battery 100c illustrated in FIGS. 12A to 12C in the positions of the positive electrodes 111, the negative electrodes 115, and the separator 103.

As illustrated in FIG. 14C, the secondary battery 100d includes the plurality of first electrode assemblies 130 and the plurality of second electrode assemblies 131.

As illustrated in FIG. 14B1, in each of the first electrode assemblies 130, a positive electrode 111b including the positive electrode active material layers on both surfaces of a positive electrode current collector, the separator 103, a negative electrode 115b including the negative electrode active material layers on both surfaces of a negative electrode current collector, the separator 103, and the positive electrode 111b including the positive electrode active material layers on both surfaces of the positive electrode current collector are stacked in this order. As illustrated in FIG. 14B2, in each of the second electrode assemblies 131, the negative electrode 115b including the negative electrode active material layers on both surfaces of the negative electrode current collector, the separator 103, the positive electrode 111b including the positive electrode active material layers on both surfaces of the positive electrode current collector, the separator 103, and the negative electrode 115*b* including the negative electrode active material layers on both surfaces of the negative electrode current collector are stacked in this order.

As illustrated in FIG. 14C, the plurality of first electrode assemblies 130 and the plurality of second electrode assemblies 131 are covered with the wound separator 103. In other words, the plurality of first electrode assemblies 130 and the plurality of second electrode assemblies 131 are positioned between the separator 103 that is spirally wound.

It is preferable that the positive electrode 111*b* of the first electrode assembly 130 that is positioned on the outermost side not include the positive electrode active material layer on the outer side.

In the example illustrated in FIGS. 14B1 and 14B2, the electrode assembly includes three electrodes and two separators; however, one embodiment of the present invention is not limited to this example. The electrode assembly may include four or more electrodes and three or more separators. As the number of electrodes is increased, the capacity of the secondary battery 100*d* can be further improved. Note that the electrode assembly may include two electrodes and one separator. In the case where the number of electrodes is small, the secondary battery 100*d* can be easily curved. In the example illustrated in FIG. 14C, the secondary battery 100*d* includes three first electrode assemblies 130 and two second electrode assemblies 131; however, one embodiment of the present invention is not limited to this example. The secondary battery 100*d* may include more electrode assemblies. As the number of electrode assemblies is increased, the capacity of the secondary battery 100*d* can be further improved. Note that the secondary battery 100*d* may include a smaller number of electrode assemblies. In the case where the number of electrode assemblies is small, the secondary battery 100*d* can be easily curved.

The description of FIGS. 12A to 12C can be referred to for structures other than the positions of the positive electrodes 111, the negative electrodes 115, and the separator 103 of the secondary battery 100*d*.

This embodiment can be implemented in appropriate combination with any of the other embodiments. In addition, the modification examples of this embodiment can be implemented in appropriate combination with any of the other modification examples.

Embodiment 5

In this embodiment, an example of an electronic device including the secondary battery described in Embodiment 1 will be described.

Figure 15:
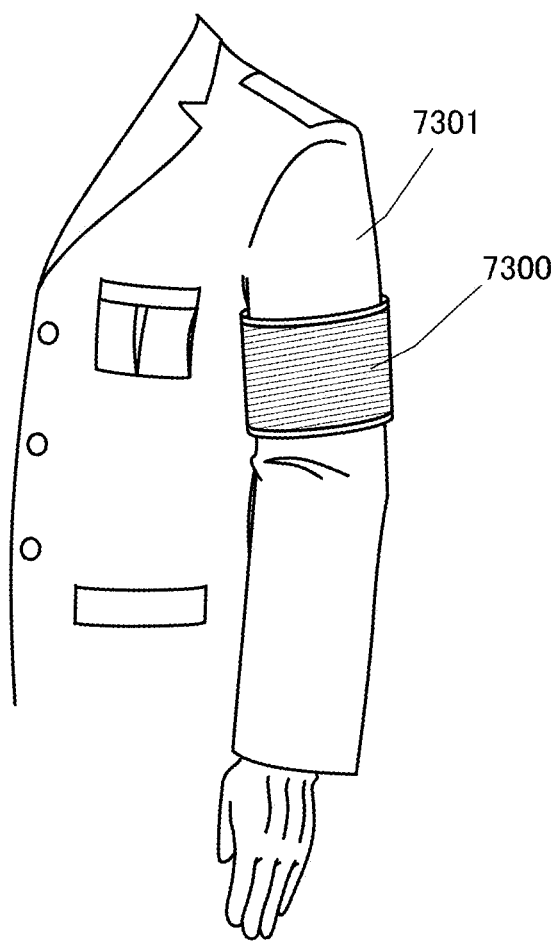
FIG. 15 is a perspective view illustrating an example of an electronic device.

FIG. 15 illustrates an example of an armband electronic device including a flexible secondary battery. An armband device 7300 illustrated in FIG. 15 can be worn on an arm 7301 and includes a display portion having a curved surface and a bendable secondary battery.

Note that in the display portion, a display element, a display device which is a device including a display element, a light-emitting element, and a light-emitting device which is a device including a light-emitting element can employ various modes or can include various elements. The display element, the display module, the display device, the light-emitting element, or the light-emitting device includes at least one of an electroluminescence (EL) element (e.g., an EL element including organic and inorganic materials, an organic EL element, or an inorganic EL element), an LED (e.g., a white LED, a red LED, a green LED, or a blue LED), a transistor (a transistor that emits light depending on current), an electron emitter, a liquid crystal element, electronic ink, an electrophoretic element, a grating light valve (GLV), a plasma display panel (PDP), a display element using micro electro mechanical systems (MEMS), a digital micromirror device (DMD), a digital micro shutter (DMS), MIRASOL (registered trademark), an interferometric modulator display (IMOD) element, a MEMS shutter display element, an optical-interference-type MEMS display element, an electrowetting element, a piezoelectric ceramic display, a display element including a carbon nanotube, and the like. Other than the above, a display element, a display device, a light-emitting element, or a light-emitting device may include a display medium whose contrast, luminance, reflectivity, transmittance, or the like is changed by electrical or magnetic effect. Note that examples of display devices having EL elements include an EL display. Examples of display devices including electron emitters are a field emission display (FED) and an SED-type flat panel display (SED: surface-conduction electron-emitter display). Examples of display devices including liquid crystal elements include a liquid crystal display (e.g., a transmissive liquid crystal display, a transflective liquid crystal display, a reflective liquid crystal display, a direct-view liquid crystal display, or a projection liquid crystal display). Examples of a display device including electronic ink, electronic liquid powder (registered trademark), or electrophoretic elements include electronic paper. In the case of a transflective liquid crystal display or a reflective liquid crystal display, some of or all of pixel electrodes function as reflective electrodes. For example, some or all of pixel electrodes are formed to contain aluminum, silver, or the like. In such a case, a memory circuit such as an SRAM can be provided under the reflective electrodes, leading to lower power consumption. Note that in the case of using an LED, graphene or graphite may be provided under an electrode or a nitride semiconductor of the LED. Graphene or graphite may be a multilayer film in which a plurality of layers are stacked. As described above, provision of graphene or graphite enables easy formation of a nitride semiconductor film thereover, such as an n-type GaN semiconductor layer including crystals. Furthermore, a p-type GaN semiconductor layer including crystals or the like can be provided thereover, and thus the LED can be formed. Note that an AlN layer may be provided between the n-type GaN semiconductor layer including crystals and graphene or graphite. The GaN semiconductor layers included in the LED may be formed by MOCVD. Note that when the graphene is provided, the GaN semiconductor layers included in the LED can also be formed by a sputtering method.

The armband device 7300 preferably further includes one or more functional elements. An example of a functional element is a sensor. As the sensor, a sensor having a function of measuring force, displacement, position, speed, acceleration, angular velocity, rotational frequency, distance, light, liquid, magnetism, temperature, chemical substance, sound, time, hardness, electric field, electric current, voltage, electric power, radiation, flow rate, humidity, gradient, oscillation, odor, or infrared rays can be used. The armband device 7300 may include a functional element such as a touch panel, an antenna, a power generation element, and a speaker.

For example, when a user wears the armband device 7300 on his or her arm and makes its display emit light at night-time, traffic safety can be ensured. For another example, when a soldier, a security guard, or the like wears the armband device 7300 on an upper arm, he or she can check a chief's command, which is received in real time and displayed on its display portion, while creeping. It is difficult for a soldier or a security guard to use a wireless device, a mobile phone, or a head-mounted device because he or she wears a helmet and has weapons or tools with hands in executing his or her duties. Thus, it is useful that a soldier or a security guard can wear the armband device 7300 on his or her upper arm and operate it by, for example, voice input to an audio input portion such as a microphone even when his or her hands are full.

The armband device 7300 can also be effectively used in the field of sports. For example, it is difficult for a marathoner to check the time on his or her watch without stopping swinging his or her arms. Stopping swinging his or her arms might disturb his or her rhythm, obstructing his or her run. However, wearing the armband device 7300 on his or her upper arm enables him or her to check the time without stopping swinging of his or her arm. Furthermore, it can display other information (e.g., his or her position in a course or his or her health condition) on its display screen. It is more useful that the armband device 7300 further has a function that allows an athlete to operate it by voice input or the like without using his or her hands, seek instructions from his or her coach by a communication function, and listen the directions output by voice output from an audio output portion such as a speaker or view the instructions displayed on its display screen.

For another example, when a construction crew or the like who wears a helmet wears the armband device 7300 and operates it, he or she can exchange information by communication to easily obtain the positional information of other crews so that he or she can work safely.

FIGS. 16A to 16F illustrate examples of other electronic devices including flexible secondary batteries. Examples of an electronic device including a flexible secondary battery include television sets (also referred to as televisions or television receivers), monitors of computers or the like, cameras such as digital cameras or digital video cameras, digital photo frames, mobile phones (also referred to as cellular phones or mobile phone devices), portable game machines, portable information terminals, audio reproducing devices, and large game machines such as pachinko machines.

In addition, a flexible secondary battery can be incorporated along a curved inside/outside wall surface of a house or a building or a curved interior/exterior surface of an automobile.

Figure 16A:
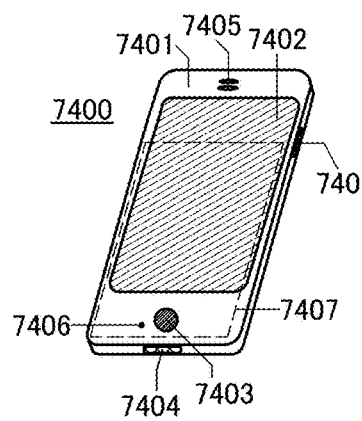
FIGS. 16A to 16F are perspective views illustrating examples of electronic devices.

FIG. 16A illustrates an example of a mobile phone. A mobile phone 7400 is provided with a display portion 7402 incorporated in a housing 7401, an operation button 7403, an external connection port 7404, a speaker 7405, a microphone 7406, and the like. Note that the mobile phone 7400 includes a secondary battery 7407.

Figure 16B:
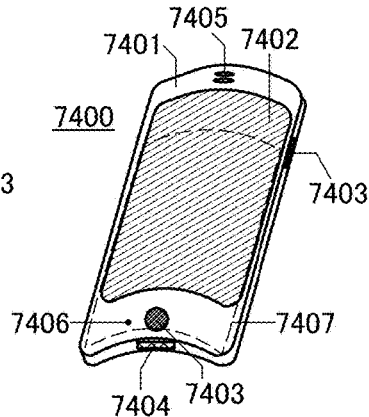
Figure 16C:
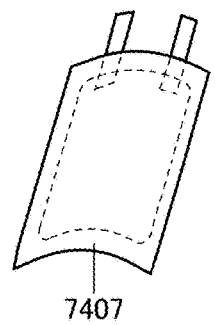

FIG. 16B illustrates the mobile phone 7400 that is curved. When the whole mobile phone 7400 is curved by external force, the secondary battery 7407 included in the mobile phone 7400 is also curved. FIG. 16C illustrates the curved secondary battery 7407. The secondary battery 7407 is a thin secondary battery. The secondary battery 7407 is curved and fixed. Note that the secondary battery 7407 includes a lead electrode electrically connected to a current collector.

Figure 16D:
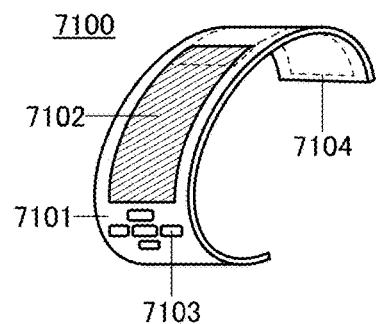
Figure 16E:
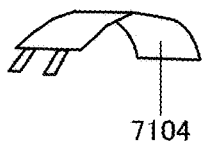
Figure 16F:
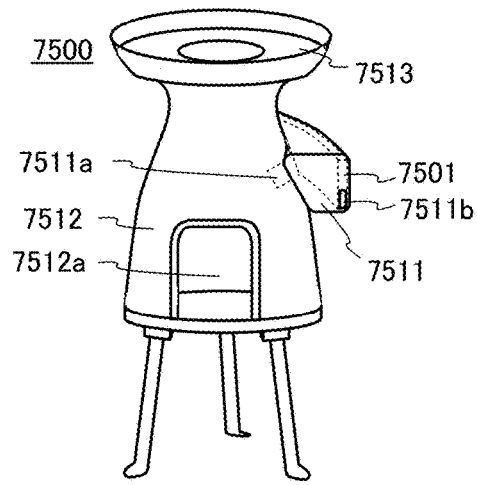

FIG. 16D illustrates an example of a bangle display device. A portable display device 7100 includes a housing 7101, a display portion 7102, an operation button 7103, and a secondary battery 7104. FIG. 16E illustrates the curved secondary battery 7104. When the curved secondary battery 7104 is on a user's arm, the housing changes its form and the curvature of part or the whole of the secondary battery 7104 is changed. Note that the radius of curvature of a curve at a point refers to the radius of the circular arc that best approximates the curve at that point. The reciprocal of the radius of curvature is curvature. Specifically, part or the whole of the housing or the main surface of the secondary battery 7104 is changed in the range of radius of curvature from 40 mm to 150 mm. When the radius of curvature at the main surface of the secondary battery 7104 is greater than or equal to 40 mm and less than or equal to 150 mm, the reliability can be kept high.

A secondary battery that can be curved can be provided with high space efficiency in any of a variety of electronic devices. For example, in a stove 7500 illustrated in FIG. 16F, a module 7511 is attached to a main body 7512. The module 7511 includes the secondary battery 7501, a motor, a fan, an air outlet 7511a, and a thermoelectric generation device. In the stove 7500, after a fuel is injected through an opening 7512a and ignited, outside air can be sent through the air outlet 7511a to the inside of the stove 7500 by rotating the motor and the fan which are included in the module 7511 using power of the secondary battery 7501. In this manner, the stove 7500 can have strong heating power because outside air can be taken into the inside of the stove 7500 efficiently. In addition, cooking can be performed on an upper grill 7513 with thermal energy generated by the combustion of fuel. The thermal energy is converted into power with the thermoelectric generation device of the module 7511, and the secondary battery 7501 is charged with the power. The power charged into the secondary battery 7501 can be output through an external terminal 7511b.

Figure 17A:
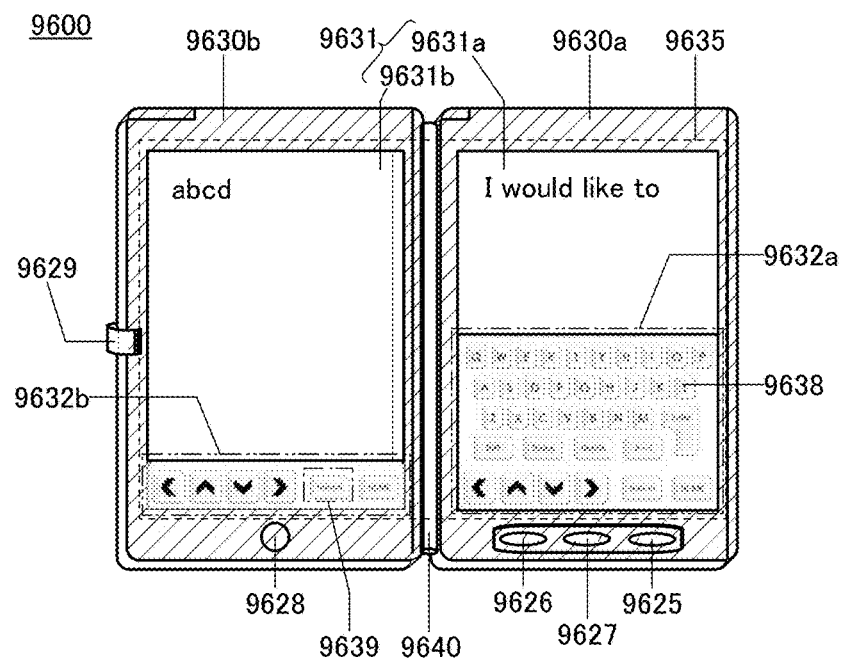
FIGS. 17A to 17C are top views and a block diagram illustrating an example of an electronic device.
Figure 17B:
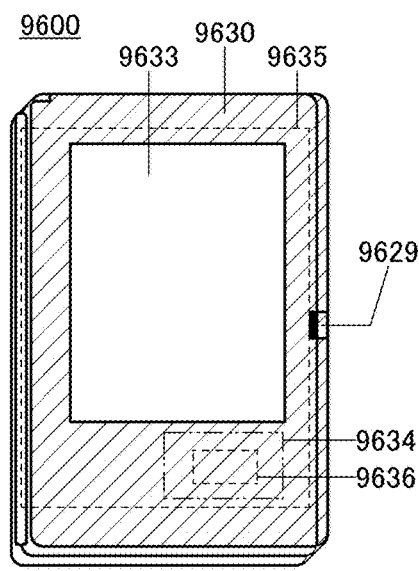

FIGS. 17A and 17B illustrate an example of a tablet terminal that can be folded in half. A tablet terminal 9600 illustrated in FIGS. 17A and 17B includes a housing 9630a, a housing 9630b, a hinge portion 9640 connecting the housings 9630a and 9630b, a display portion 9631 including a display portion 9631a and a display portion 9631b, a display mode switch 9626, a power switch 9627, a power-saving mode switch 9625, a fastener 9629, and an operation switch 9628. FIGS. 17A and 17B illustrate the tablet terminal 9600 opened and closed, respectively.

The tablet terminal 9600 includes a secondary battery 9635 inside the housings 9630a and 9630b. The secondary battery 9635 is provided across the housings 9630a and 9630b, passing through the hinge portion 9640.

Part of the display portion 9631a can be a touch panel region 9632a, and data can be input by touching operation keys 9638 that are displayed. Note that FIG. 17A illustrates, as an example, that half of the area of the display portion 9631a has only a display function and the other half of the area has a touch panel function. However, the structure of the display portion 9631a is not limited to this, and all the area of the display portion 9631a may have a touch panel function. For example, all the area of the display portion 9631a can display keyboard buttons and serve as a touch panel while the display portion 9631b can be used as a display screen.

As in the display portion 9631a, part of the display portion 9631b can be a touch panel region 9632b. When a keyboard display switching button 9639 displayed on the touch panel is touched with a finger, a stylus, or the like, a keyboard can be displayed on the display portion 9631b.

Touch input can be performed in the touch panel region 9632a and the touch panel region 9632b at the same time.

The switch 9626 for switching a display mode allows switching between a landscape mode and a portrait mode, color display and black-and-white display, and the like. The power-saving mode switch 9625 can control display luminance in accordance with the amount of external light in use of the tablet terminal 9600, which is measured with an optical sensor incorporated in the tablet terminal 9600. In addition to the optical sensor, other detecting devices such as sensors for determining inclination, such as a gyroscope or an acceleration sensor, may be incorporated in the tablet terminal.

Note that FIG. 17A illustrates an example in which the display portion 9631a and the display portion 9631b have the same display area; however, one embodiment of the present invention is not limited and one of the display portions may be different from the other display portion in size and display quality. For example, one of the display portions 9631a and 9631b may display higher definition images than the other.

The tablet terminal is closed in FIG. 17B. The tablet terminal includes the housing 9630, a solar cell 9633, and a charge and discharge control circuit 9634 including a DC-DC converter 9636. The secondary battery of one embodiment of the present invention is used for the secondary battery 9635.

The tablet terminal 9600 can be folded so that the housings 9630a and 9630b overlap with each other when not in use. Thus, the display portions 9631a and 9631b can be protected, which increases the durability of the tablet terminal 9600. In addition, the secondary battery 9635 of one embodiment of the present invention has flexibility and can be repeatedly bent without a large decrease in charge and discharge capacity. Thus, a highly reliable tablet terminal can be provided.

The tablet terminal illustrated in FIGS. 17A and 17B can also have a function of displaying various kinds of data (e.g., a still image, a moving image, and a text image), a function of displaying a calendar, a date, or the time on the display portion, a touch-input function of operating or editing data displayed on the display portion by touch input, a function of controlling processing by various kinds of software (programs), and the like.

The solar cell 9633, which is attached on the surface of the tablet terminal, supplies electric power to a touch panel, a display portion, an image signal processor, and the like. Note that the solar cell 9633 can be provided on one or both surfaces of the housing 9630 and the secondary battery 9635 can be charged efficiently. When the secondary battery of one embodiment of the present invention is used as the secondary battery 9635, a tablet terminal can be used for a long period because the deterioration of discharge capacity caused by repetition of charging and discharging can be suppressed.

Figure 17C:
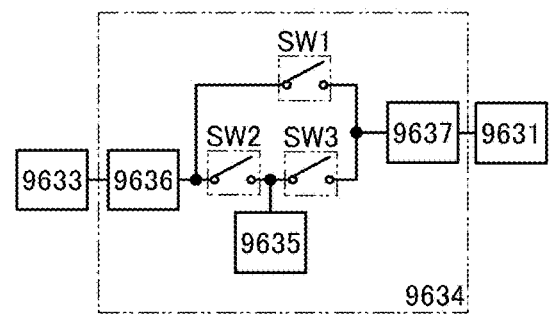

The structure and the operation of the charge and discharge control circuit 9634 illustrated in FIG. 17B will be described with reference to a block diagram in FIG. 17C. The solar cell 9633, the secondary battery 9635, the DC-DC converter 9636, a converter 9637, switches SW1 to SW3, and the display portion 9631 are illustrated in FIG. 17C, and the secondary battery 9635, the DC-DC converter 9636, the converter 9637, and the switches SW1 to SW3 correspond to the charge and discharge control circuit 9634 in FIG. 17B.

First, an example of operation in the case where power is generated by the solar cell 9633 using external light is described. The voltage of electric power generated by the solar cell is raised or lowered by the DC-DC converter 9636 to a voltage for charging the secondary battery 9635. When the display portion 9631 is operated with the power from the solar cell 9633, the switch SW1 is turned on and the voltage of the power is raised or lowered by the converter 9637 to a voltage needed for operating the display portion 9631. In addition, when display on the display portion 9631 is not performed, the switch SW1 is turned off and the switch SW2 is turned on so that the secondary battery 9635 may be charged.

Note that the solar cell 9633 is described as an example of a power generation means; however, one embodiment of the present invention is not limited to this example. The secondary battery 9635 may be charged using another power generation means such as a piezoelectric element or a thermoelectric conversion element (Peltier element). For example, the secondary battery 9635 may be charged with a non-contact power transmission module capable of performing charging by transmitting and receiving electric power wirelessly (without contact), or any of the other charge means used in combination.

The secondary battery described in Embodiment 1 can be provided in wearable devices illustrated in FIGS. 18A, 18B1, and 18B2.

Figure 18A:
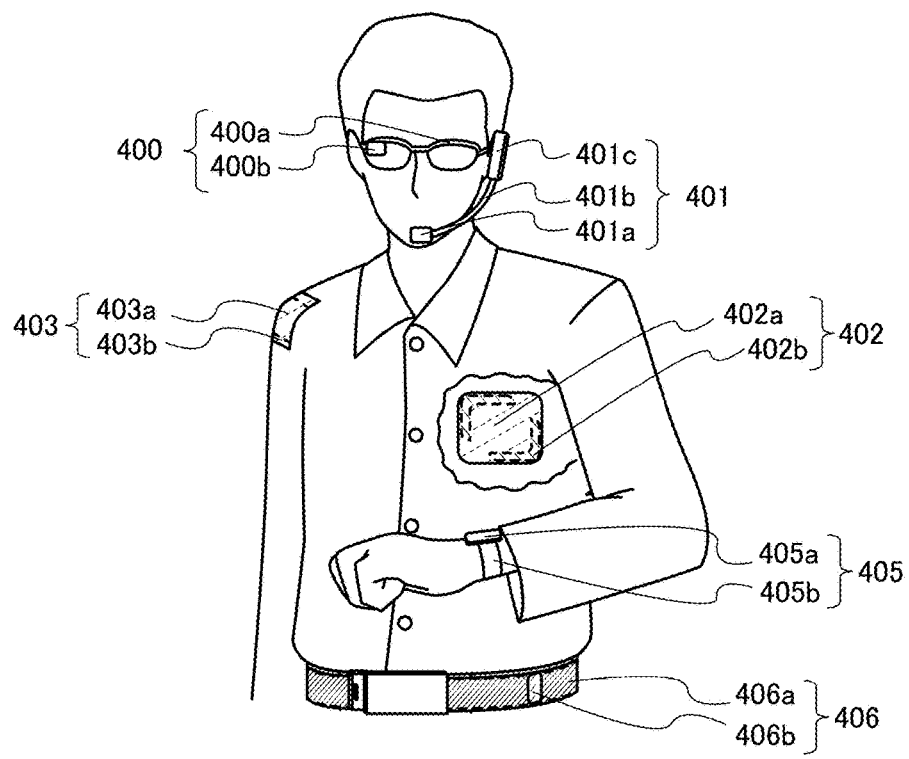
Figure 18A:
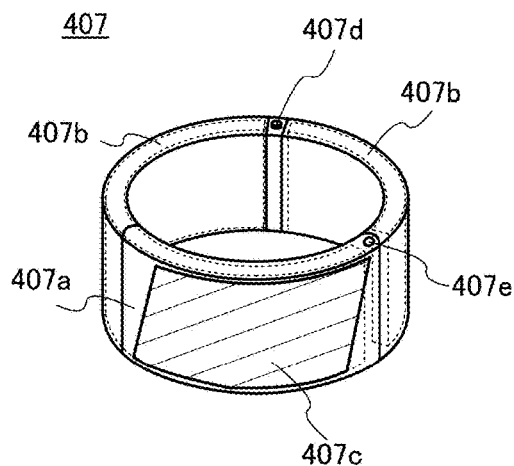
Figure 18A:
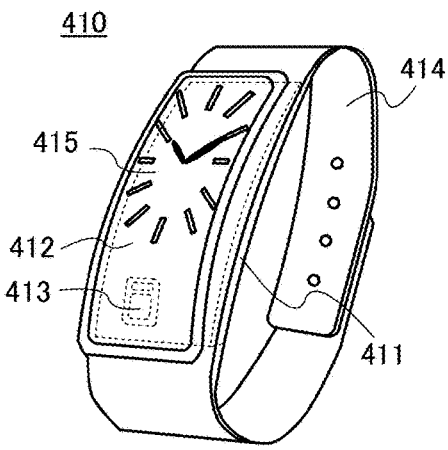

For example, the secondary battery can be provided in a glasses-type device 400 illustrated in FIG. 18A. The glasses-type device 400 includes a frame 400a and a display portion 400b. The secondary battery is provided in a temple of the frame 400a with a curved shape, whereby the glasses-type device 400 can have a well-balanced weight and can be used continuously for a long time.

The secondary battery can be provided in a headset-type device 401. The headset-type device 401 includes at least a microphone part 401a, a flexible pipe 401b, and an earphone part 401c. The secondary battery can be provided in the flexible pipe 401b and the earphone part 401c.

Furthermore, the secondary battery can be provided in a device 402 that can be attached directly to a body. The secondary battery 402b can be provided in a thin housing 402a of the device 402.

Furthermore, the secondary battery can be provided in a device 403 that can be attached to clothes. The secondary battery 403b can be provided in a thin housing 403a of the device 403.

Furthermore, the secondary battery can be provided in a watch-type device 405. The watch-type device 405 includes a display portion 405a and a belt portion 405b, and the secondary battery can be provided in the display portion 405a or the belt portion 405b.

Furthermore, the secondary battery can be provided in a belt-type device 406. The belt-type device 406 includes a belt portion 406a and a wireless power feeding and receiving portion 406b, and the secondary battery can be provided inside the belt portion 406a.

The secondary battery described in Embodiment 1 can be provided in a wristband device 407 illustrated in FIG. 18B1. The wristband device 407 includes two curved secondary batteries 407b in a case 407a. A curved display portion 407c is provided over a surface of the case 407a. For the display portion which can be used for the display portion 407c, the description of the display portion in FIG. 15 can be referred to. The armband device 407 includes a connection portion 407d and a hinge portion 407e. A portion between the connection portion 407d and the hinge portion 407e can be flexibly moved using the hinge portion 407e as an axis. Charging or the like through an external terminal provided in the connection portion 407d is also possible.

The secondary battery described in the Embodiment 1 can be provided in a wearable device 410 illustrated in FIG. 18B2. The wearable device 410 is provided with a curved secondary battery 412 and a sensor portion 413 in a main body 411. The wearable device 410 includes a display portion 415 and a band portion 414 and can be worn on a wrist, for example. For the display portion which can be used for the display portion 415, the description of the display portion in FIG. 15 can be referred to. The display portion 415 can display various kinds of information such as time as illustrated in FIG. 18B2 and reception information of an e-mail or an incoming call.

In addition, the watch-type device 405 and the wearable device 410 are wearable devices that are wound around an arm directly; thus, a sensor that measures the pulse, the blood pressure, or the like of the user may be incorporated therein. Data on the exercise quantity and health of the user can be stored to be used for health maintenance.

Furthermore, devices that can be carried around, such as the above-described armband device 7300, mobile phone 7400, portable display device 7100, tablet terminal 9600, belt-type device 406, watch-type device 405, armband device 407, and wearable device 410, may be provided with a positioning system such as the global positioning system (GPS). With the system, the user can find his/her present position, and the system is useful in dealing with kidnapping, wandering, and the like.

Figure 19:
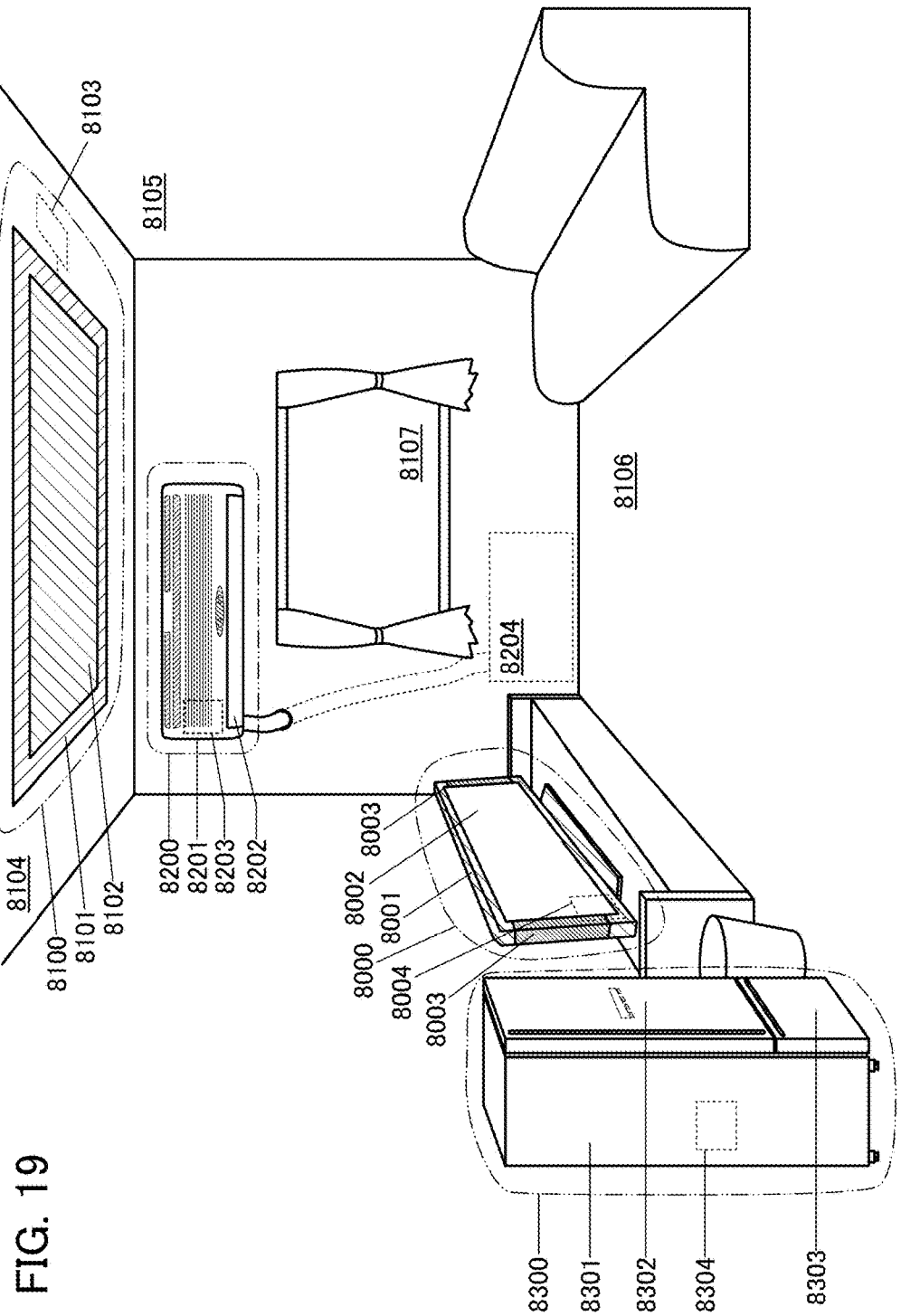
FIG. 19 is a perspective view illustrating examples of electronic devices.

FIG. 19 illustrates examples of other electronic devices. In FIG. 19, a display device 8000 is an example of an electronic device using a secondary battery 8004 of one embodiment of the present invention. Specifically, the display device 8000 corresponds to a display device for TV broadcast reception and includes a housing 8001, a display portion 8002, speaker portions 8003, the secondary battery 8004, and the like. The secondary battery 8004 of one embodiment of the present invention is provided in the housing 8001. The display device 8000 can receive power from a commercial power source. Alternatively, the display device 8000 can use power stored in the secondary battery 8004. Thus, the display device 8000 can be operated with the use of the secondary battery 8004 of one embodiment of the present invention as an uninterruptible power source even when power cannot be supplied from a commercial power source due to power failure or the like.

A semiconductor display device such as a liquid crystal display device, a light-emitting device in which a light-emitting element such as an organic EL element is provided in each pixel, an electrophoretic display device, a digital micromirror device (DMD), a plasma display panel (PDP), or a field emission display (FED) can be used for the display portion 8002.

Note that the display device includes, in its category, all of information display devices for personal computers, advertisement displays, and the like besides TV broadcast reception.

In FIG. 19, an installation lighting device 8100 is an example of an electronic device using a secondary battery 8103 of one embodiment of the present invention. Specifically, the installation lighting device 8100 includes a housing 8101, a light source 8102, the secondary battery 8103, and the like. Although FIG. 19 illustrates the case where the secondary battery 8103 is provided in a ceiling 8104 on which the housing 8101 and the light source 8102 are installed, the secondary battery 8103 may be provided in the housing 8101. The installation lighting device 8100 can receive power from a commercial power source. Alternatively, the installation lighting device 8100 can use power stored in the secondary battery 8103. Thus, the installation lighting device 8100 can be operated with the use of the secondary battery 8103 of one embodiment of the present invention as an uninterruptible power source even when power cannot be supplied from a commercial power source due to power failure or the like.

Note that although the installation lighting device 8100 provided in the ceiling 8104 is illustrated in FIG. 19 as an example, the secondary battery of one embodiment of the present invention can be used as an installation lighting device provided in, for example, a wall 8105, a floor 8106, a window 8107, or the like other than the ceiling 8104. Alternatively, the secondary battery can be used in a tabletop lighting device or the like.

As the light source 8102, an artificial light source which emits light artificially by using electric power can be used. Specifically, an incandescent lamp, a discharge lamp such as a fluorescent lamp, and light-emitting elements such as an LED and an organic EL element are given as examples of the artificial light source.

In FIG. 19, an air conditioner including an indoor unit 8200 and an outdoor unit 8204 is an example of an electronic device using a secondary battery 8203 of one embodiment of the present invention. Specifically, the indoor unit 8200 includes a housing 8201, an air outlet 8202, the secondary battery 8203, and the like. Although FIG. 19 illustrates the case where the secondary battery 8203 is provided in the indoor unit 8200, the secondary battery 8203 may be provided in the outdoor unit 8204.

Alternatively, the secondary batteries 8203 may be provided in both the indoor unit 8200 and the outdoor unit 8204. The air conditioner can receive power from a commercial power source. Alternatively, the air conditioner can use power stored in the secondary battery 8203. Particularly in the case where the secondary batteries 8203 are provided in both the indoor unit 8200 and the outdoor unit 8204, the air conditioner can be operated with the use of the secondary battery 8203 of one embodiment of the present invention as an uninterruptible power source even when power cannot be supplied from a commercial power source due to power failure or the like.

Note that although the split-type air conditioner including the indoor unit and the outdoor unit is illustrated in FIG. 19 as an example, the secondary battery of one embodiment of the present invention can be used in an air conditioner in which the functions of an indoor unit and an outdoor unit are integrated in one housing.

In FIG. 19, an electric refrigerator-freezer 8300 is an example of an electronic device using a secondary battery 8304 of one embodiment of the present invention. Specifically, the electric refrigerator-freezer 8300 includes a housing 8301, a door for a refrigerator 8302, a door for a freezer 8303, the secondary battery 8304, and the like. The secondary battery 8304 is provided inside the housing 8301 in FIG. 19. The electric refrigerator-freezer 8300 can receive power from a commercial power source. Alternatively, the electric refrigerator-freezer 8300 can use power stored in the secondary battery 8304. Thus, the electric refrigerator-freezer 8300 can be operated with the use of the secondary battery 8304 of one embodiment of the present invention as an uninterruptible power source even when power cannot be supplied from a commercial power source due to power failure or the like.

This embodiment can be implemented in appropriate combination with any of the other embodiments.

Embodiment 6

In this embodiment, examples of vehicles including the secondary battery described in Embodiment 1 will be described.

The use of secondary batteries in vehicles enables production of next-generation clean energy vehicles such as hybrid electric vehicles (HEVs), electric vehicles (EVs), and plug-in hybrid electric vehicles (PHEVs).

Figure 20A:
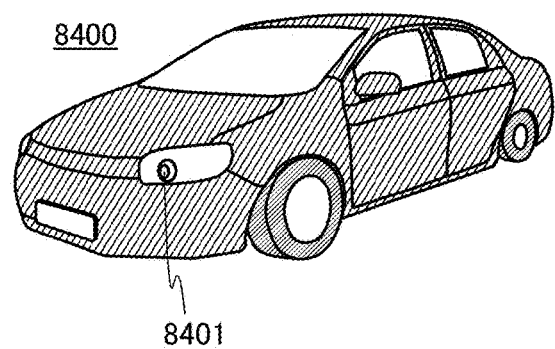
FIGS. 20A and 20B are perspective views illustrating examples of electronic devices.
Figure 20B:
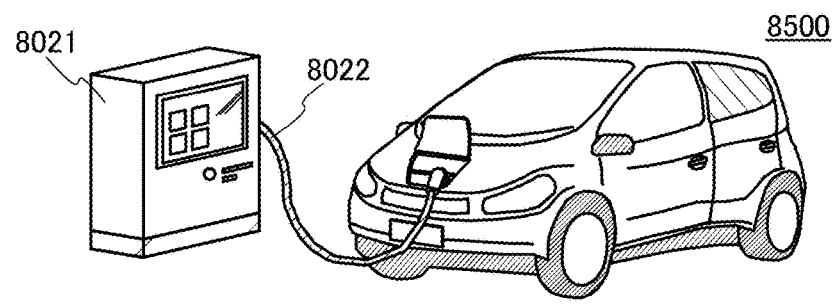

FIGS. 20A and 20B each illustrate an example of a vehicle using one embodiment of the present invention. An automobile 8400 illustrated in FIG. 20A is an electric vehicle which runs on the power of the electric motor. Alternatively, the automobile 8400 is a hybrid electric vehicle capable of driving using either the electric motor or the engine as appropriate. One embodiment of the present invention achieves a high-mileage vehicle. The automobile 8400 includes the secondary battery. The secondary battery is used not only to drive the electric motor, but also to supply electric power to a light-emitting device such as a headlight 8401 or a room light (not illustrated).

The secondary battery can also supply electric power to a display device of a speedometer, a tachometer, or the like included in the automobile 8400. Furthermore, the secondary battery can supply electric power to a semiconductor device included in the automobile 8400, such as a navigation system.

FIG. 20B illustrates an automobile 8500 including the secondary battery. The automobile 8500 can be charged when the secondary battery is supplied with electric power through external charging equipment by a plug-in system, a contactless power feeding system, or the like. In FIG. 20B, the secondary battery included in the automobile 8500 is charged with the use of a ground-based charging apparatus 8021 through a cable 8022. In charging, a given method such as CHAdeMO (registered trademark) or Combined Charging System may be referred to for a charging method, the standard of a connector, or the like as appropriate. The charging apparatus 8021 may be a charging station provided in a commerce facility or a power source in a house. With the use of a plug-in technique, the secondary battery included in the automobile 8500 can be charged by being supplied with electric power from outside, for example. The charging can be performed by converting AC electric power into DC electric power through a converter such as an AC-DC converter.

Further, although not illustrated, the vehicle may include a power receiving device so as to be charged by being supplied with electric power from an above-ground power transmitting device in a contactless manner. In the case of the contactless power supply system, by fitting the power transmitting device in a road or an exterior wall, charging can be performed not only when the electric vehicle is stopped but also when driven. In addition, the contactless power supply system may be utilized to perform transmission/reception between vehicles. A solar cell may be provided in the exterior of the vehicle to charge the secondary battery when the vehicle stops or moves. To supply electric power in such a contactless manner, an electromagnetic induction method or a magnetic resonance method can be used.

Furthermore, the secondary battery included in the vehicle can be used as a power source for supplying electric power to products other than the vehicle. In such a case, the use of a commercial power source can be avoided at peak time of electric power demand.

This embodiment can be implemented in appropriate combination with any of the other embodiments.

Example 1

In this example, results obtained by calculating stress applied to electrodes with different percentages of a stress relaxation region are described with reference to FIGS. 22A and 22B, FIGS. 23A and 23B, FIGS. 24A and 24B, FIGS. 25A and 25B, FIG. 26, and FIG. 27.

As software for the calculation, ANSYS Mechanical APDL 14.0 was used. Calculation conditions are as follows: a material of the electrode is aluminum (the Young's modulus is $7.03 \times 10^{10}$ Pa and the Poisson's ratio is 0.345); the element type is 187 (three-dimensional 10-node tetrahedral solid); and the number of elements is 20.

Figure 22A:
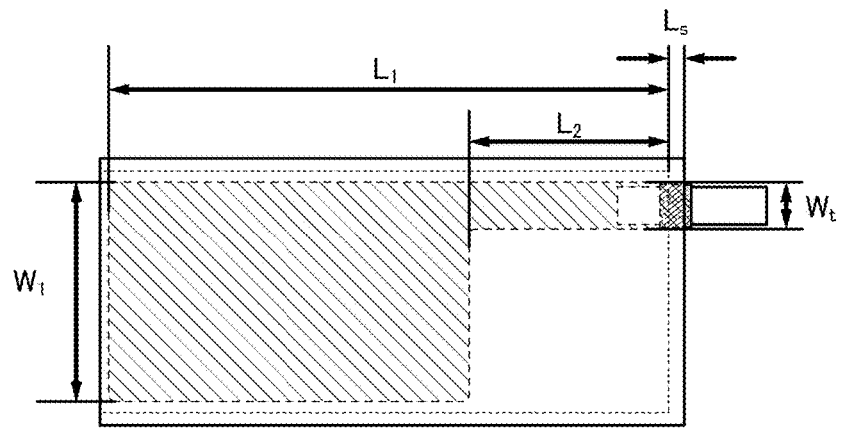
FIGS. 22A and 22B illustrate a model used for calculation.

As the electrode model used for calculation is described with reference to FIGS. 22A and 22B. As illustrated in FIG. 22A, the length of a sealing region is referred to as $L_s$. The sum of the lengths of a lead and an electrode not overlapping with the lead in an inner region is referred to as $L_1$. The length of a stress relaxation region (here, the sum of the lengths of the lead and an electrode tab not overlapping with the lead in the inner region) is referred to as $L_2$. In addition, the width of the electrode tab and the maximum width of the electrode are referred to as $W_t$ and $W_1$, respectively.

Figure 22B:
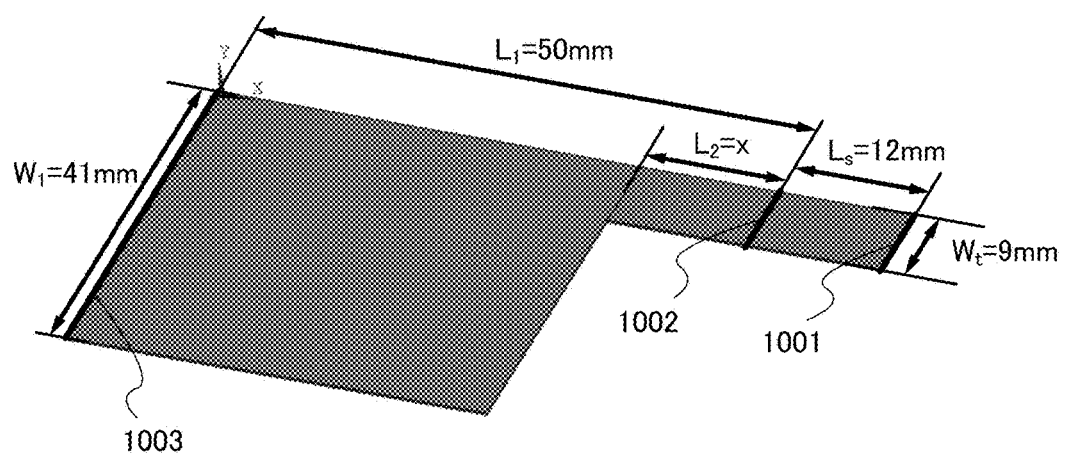

Then, as illustrated in FIG. 22B, $L_s$, $L_1$, $W_t$, $W_1$, are set to 12 mm, 50 mm, 9 mm, and 41 mm, respectively, the thickness is set to 0.2 mm (not illustrated), and $L_2$ is set to a variable. In addition, a portion 1001 corresponding to one end portion of the sealing region is fixed at a plane, and a portion 1002 corresponding to the other end portion of the sealing region is fixed so as not to move only in a y-axis direction. Note that the y-axis direction is a direction perpendicular to the paper of FIG. 22A. Then, when a portion 1003 corresponding to an electrode end portion which is positioned farthest from the sealing region is displaced downward by 1 mm in the y-axis direction, that is, when the electrode end portion is lower than the reference surface by 1 mm, the distribution of stress applied to the electrode and the maximum value of stress are calculated.

Figure 23A:
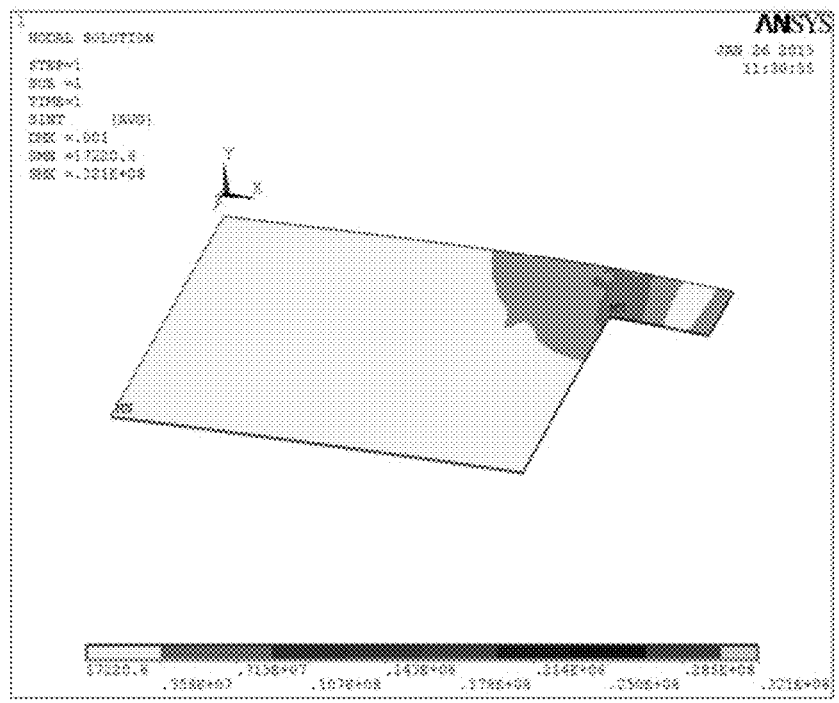
FIGS. 23A and 23B show calculation results.
Figure 23B:
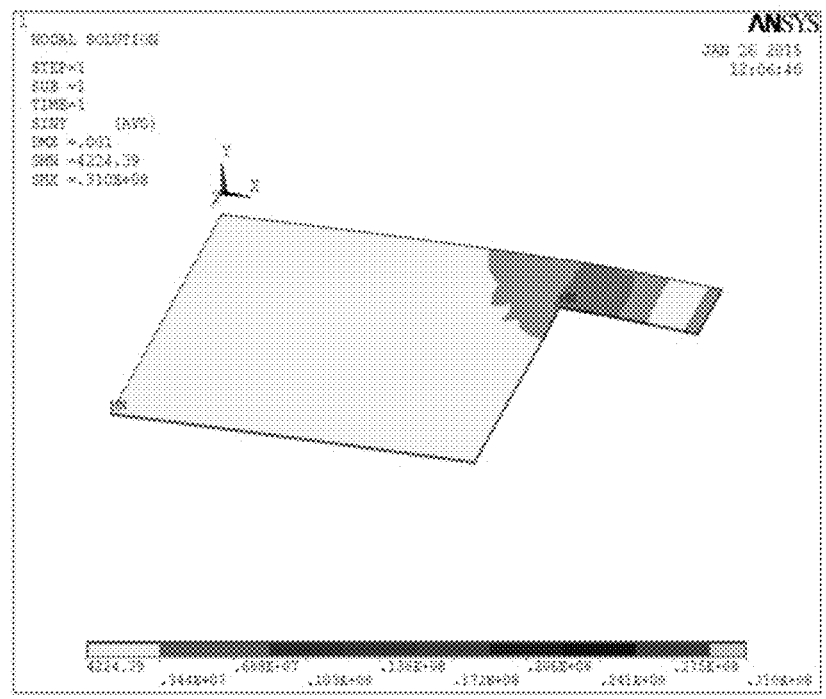
Figure 24A:
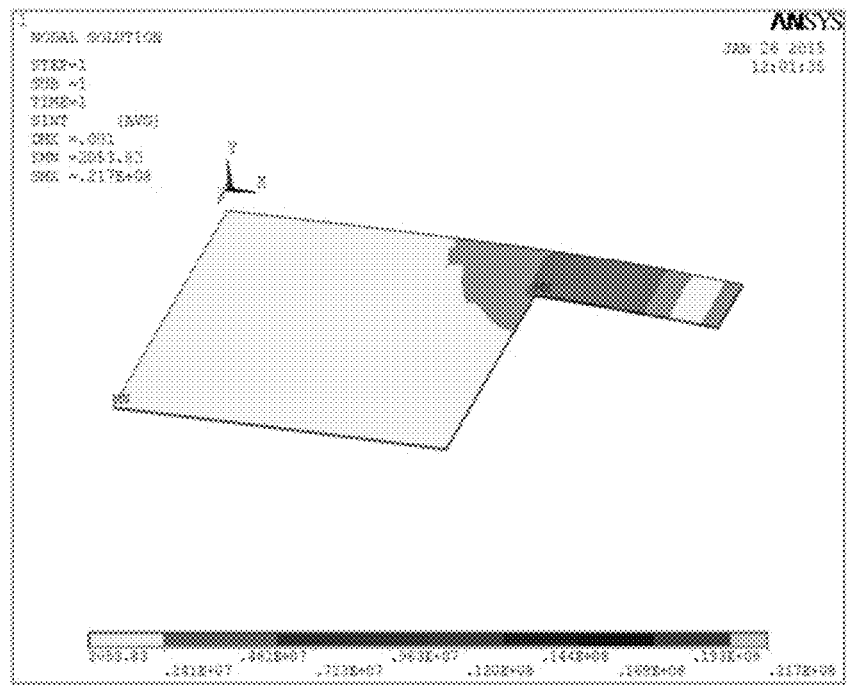
FIGS. 24A and 24B show calculation results.
Figure 24B:
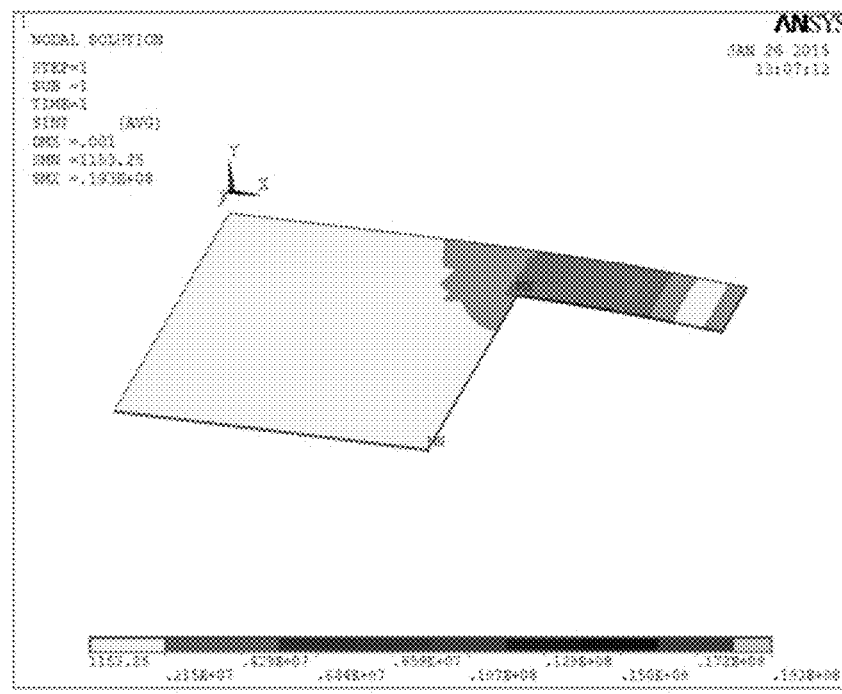
Figure 25A:
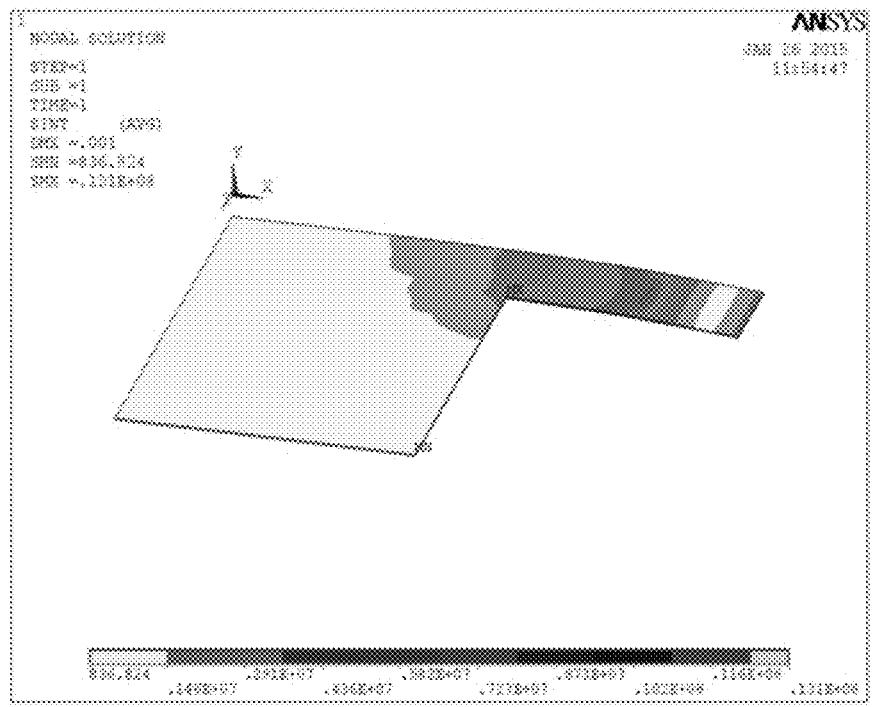
FIGS. 25A and 25B show calculation results.
Figure 25B:
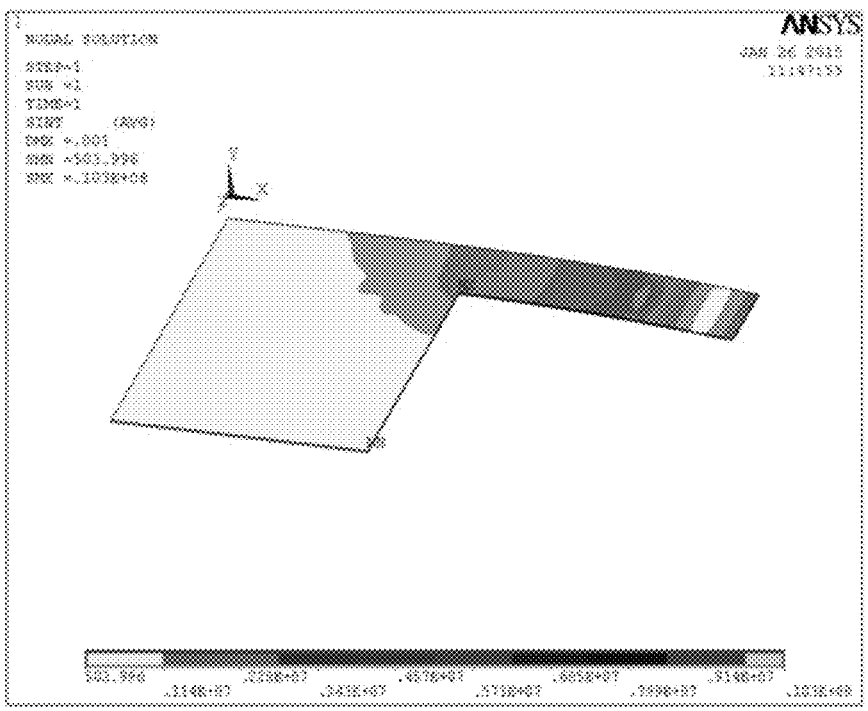
Figure 26:
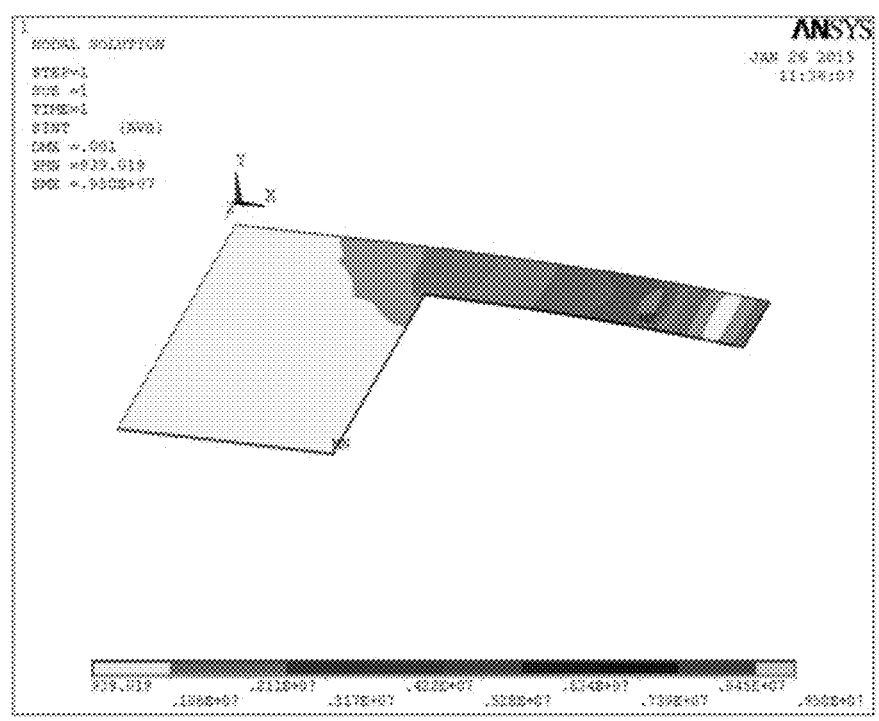
FIG. 26 shows a calculation result.

FIGS. 23A and 23B, FIGS. 24A and 24B, FIGS. 25A and 25B, and FIG. 26 show calculation results of the distribution of stress applied to the electrode. FIG. 23A shows the case where $L_2/L_1=0\%$, and the maximum stress is $3.21 \times 10^7$ Pa. FIG. 23B shows the case where $L_2/L_1=10\%$, and the maximum stress is $3.10 \times 10^7$ Pa. FIG. 24A shows the case where $L_2/L_1=20\%$, and the maximum stress is $2.17 \times 10^7$ Pa. FIG. 24B shows the case where $L_2/L_1=25\%$, and the maximum stress is $1.93 \times 10^7$ Pa. FIG. 25A shows the case where $L_2/L_1=30\%$, and the maximum stress is $1.31 \times 10^7$ Pa. FIG. 25B shows the case where $L_2/L_1=40\%$, and the maximum stress is $1.03 \times 10^7$ Pa. FIG. 26 shows the case where $L_2/L_1=50\%$, and the maximum stress is $1.93 \times 10^6$ Pa.

Figure 27:
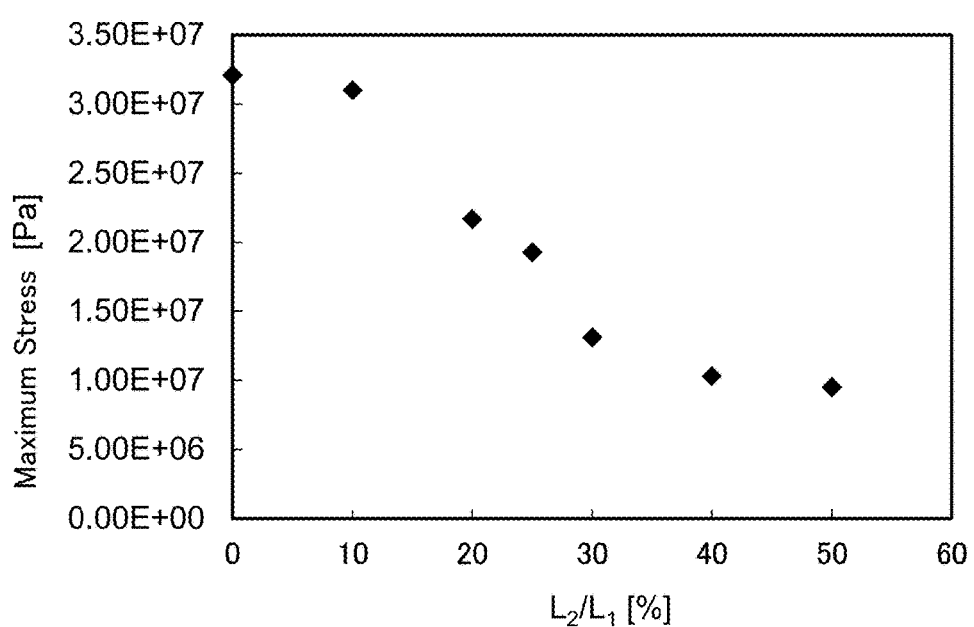
FIG. 27 is a graph showing calculation results.

FIG. 27 is a graph showing the relation between the percentage of the stress relaxation region and the maximum stress. As shown in FIG. 27, when $L_2/L_1$ is 20% or more, stress applied to the electrode can be relaxed. In particular, when $L_2/L_1$ is 30% or more, stress applied to the electrode can be relaxed to less than or equal to half of that when $L_2/L_1$ is 0%.

Example 2

An example using aluminum is shown in Example 1; however, in this example, examples using copper (Cu) and titanium (Ti) are shown.

As software for the calculation, ANSYS Mechanical APDL 14.0 was used. Calculation conditions are as follows: a material of the electrode is copper (the Young's modulus is $117.5 \times 10^9$ Pa and the Poisson's ratio is 0.321). Conditions other than the electrode material are the same as those in Example 1; thus, the conditions are not described here.

Figure 28:
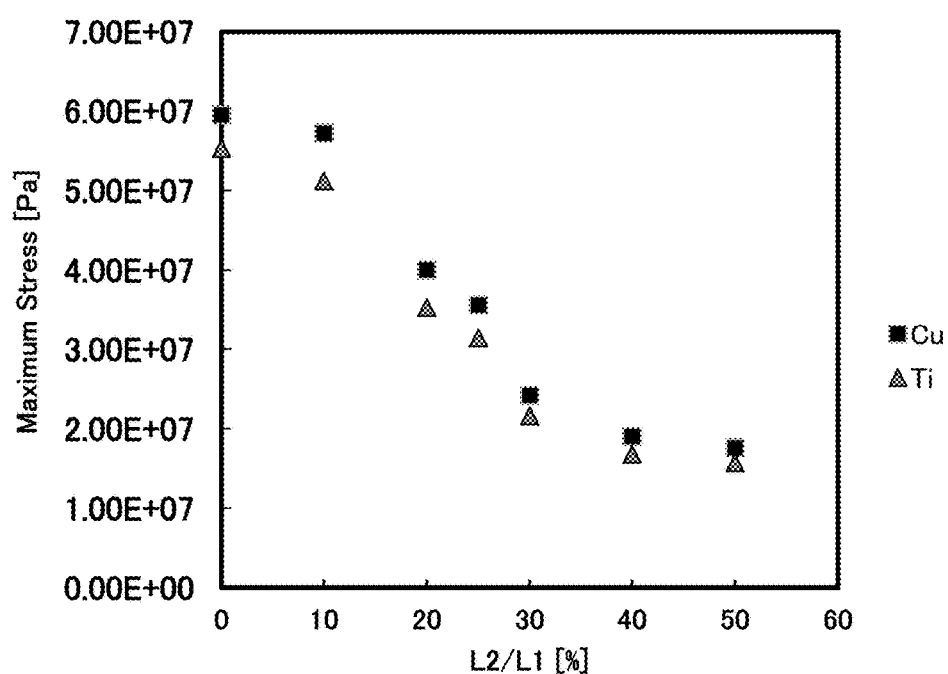
FIG. 28 is a graph showing calculation results.

FIG. 28 is a graph showing the relation between the percentage of the stress relaxation region and the maximum stress when the electrode material is copper.

The graph of FIG. 28 also shows the relation between the percentage of the stress relaxation region and the maximum stress when the electrode material is titanium. Note that calculation conditions are the same as those in Example 1 except that the electrode material is titanium (the Young's modulus is $129.8 \times 10^9$ Pa and the Poisson's ratio is 0.343); thus, the conditions are not described here.

In this example, the results of the case where the electrode material is copper and the case where the electrode material is titanium are shown in FIG. 28, and the results show a tendency similar to that of the results shown in FIG. 27. Thus, when $L_2/L_1$ is 20% or more, stress applied to the electrode can be relaxed regardless of the electrode material. In particular, when $L_2/L_1$ is 30% or more, stress applied to the electrode can be relaxed to less than or equal to half of that when $L_2/L_1$ is 0%.

This application is based on Japanese Patent Application serial no. 2015-020576 filed with Japan Patent Office on Feb. 4, 2015, the entire contents of which are hereby incorporated by reference.

What is claimed is:

1. A secondary battery comprising:
    a first electrode comprising a body, a tab extending from an end portion of the body along a first direction and a slit in the body extending from the end portion of the tab along the first direction;
    a lead overlapping with and electrically connected to the tab; and
    an exterior body folded so that the first electrode and the lead are sandwiched by the exterior body, wherein a first end portion of the exterior body and a second end portion of the exterior body are attached to each other by a sealing layer,
    wherein, in an inner region encapsulated by the folded exterior body and the sealing layer, a sum of lengths of the lead, part of the tab not overlapping with the lead, and the slit along the first direction is 30% or more of a sum of lengths of the lead and part of the first electrode not overlapping with the lead along the first direction, and
    wherein, in the inner region, the sum of lengths of the lead, the part of the tab not overlapping with the lead, and the slit along the first direction is 30% or more and 95% or less of the sum of lengths of the lead and the part of the first electrode not overlapping with the lead along the first direction.

2. The secondary battery according to claim 1, comprising:
    a second electrode; and
    a separator between the first electrode and the second electrode,
    wherein the second electrode and the separator are sandwiched by the exterior body.

3. The secondary battery according to claim 1, wherein the tab and the lead compose a stress relaxation region.

4. The secondary battery according to claim 1, wherein a width of the tab is smaller than a width of the first electrode.

5. The secondary battery according to claim 1, wherein the first electrode is a positive electrode or a negative electrode.

6. The secondary battery according to claim 1, wherein the first electrode is flexible.

7. The secondary battery according to claim 1, wherein the first electrode comprises a current collector and an active material layer.

8. The secondary battery according to claim 7, wherein the active material layer comprises active material particles and a graphene flake between the active material particles.

9. A secondary battery comprising:
    a first electrode comprising a body, a tab extending from an end portion of the body along a first direction and a slit in the body extending from the end portion of the tab along the first direction;
    a lead overlapping with and electrically connected to the tab; and
    an exterior body folded so that the first electrode and the lead are sandwiched by the exterior body, wherein a first end portion of the exterior body and a second end portion of the exterior body are attached to each other by a sealing layer,
    wherein, in an inner region encapsulated by the folded exterior body and the sealing layer, a sum of lengths of the lead, part of the tab not overlapping with the lead, and the slit along the first direction is 30% or more of a sum of lengths of the lead and part of the first electrode not overlapping with the lead along the first direction.

10. The secondary battery according to claim 9, comprising:
    a second electrode; and
    a separator between the first electrode and the second electrode,
    wherein the second electrode and the separator are sandwiched by the exterior body.

11. The secondary battery according to claim 9, wherein the tab and the lead compose a stress relaxation region.

12. The secondary battery according to claim 9, wherein a width of the tab is smaller than a width of the first electrode.

13. The secondary battery according to claim 9, wherein the first electrode is a positive electrode or a negative electrode.

14. The secondary battery according to claim 9, wherein the first electrode is flexible.

15. The secondary battery according to claim 9, wherein the first electrode comprises a current collector and an active material layer.

16. The secondary battery according to claim 15, wherein the active material layer comprises active material particles and a graphene flake between the active material particles.

* * * * *